US012699501B2

(12) United States Patent
Wu et al.

(10) Patent No.: US 12,699,501 B2
(45) Date of Patent: Aug. 4, 2026

(54) METHOD AND APPARATUS FOR MARKING ARTICLES IN VIRTUAL ENVIRONMENT, DEVICE AND STORAGE MEDIUM

(71) Applicant: Tencent Technology (Shenzhen) Company Limited, Shenzhen (CN)

(72) Inventors: Tian Wu, Shenzhen (CN); Ruobing Chai, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 730 days.

(21) Appl. No.: 18/140,183

(22) Filed: Apr. 27, 2023

(65) Prior Publication Data

US 2023/0333718 A1 Oct. 19, 2023

Related U.S. Application Data

(63) Continuation of application No. PCT/CN2022/092178, filed on May 11, 2022.

(30) Foreign Application Priority Data

Jun. 9, 2021 (CN) .......................... 202110642541.4

(51) Int. Cl.
*G06F 3/0484* (2022.01)
*A63F 13/2145* (2014.01)
(Continued)

(52) U.S. Cl.
CPC ............ *G06F 3/0484* (2013.01); *A63F 13/42* (2014.09); *A63F 13/5372* (2014.09);
(Continued)

(58) Field of Classification Search
CPC .......... A63F 13/55; A63F 13/52; A63F 13/50; A63F 13/42; A63F 13/5372;
(Continued)

(56) References Cited

U.S. PATENT DOCUMENTS 10,937,220 B2 * 3/2021 Mitchell ............... A63F 13/573
2016/0202894 A1 * 7/2016 Kim ........................ G06F 3/165
715/716

(Continued)

FOREIGN PATENT DOCUMENTS

CN 109126129 A * 1/2019 ........... A63F 13/837
CN 110115838 A 8/2019
(Continued)

OTHER PUBLICATIONS

Apex Legend ("Apex Legends Beginner's Guide"—Downloading 2019 (8 pages) (Year: 2019).*
(Continued)

*Primary Examiner* — Quoc A Tran
(74) *Attorney, Agent, or Firm* — Crowell & Moring LLP

(57) ABSTRACT

A method for marking a virtual article in a virtual environment includes: displaying a pickup list of a first virtual object, where the pickup list is used to display at least one virtual article to be picked up by the first virtual object in the virtual environment, and list items in the pickup list are arranged in a first direction; receiving a first sliding operation performed on the pickup list; and sliding the list item of the target virtual article in the pickup list along a second direction in response to the first sliding operation, and displaying the target virtual article in a marked state, where the marked state is used to share position information of the target virtual article to a second virtual object.

20 Claims, 11 Drawing Sheets

(51) Int. Cl.

| | |
|---|---|
| *A63F 13/42* | (2014.01) |
| *A63F 13/426* | (2014.01) |
| *A63F 13/50* | (2014.01) |
| *A63F 13/52* | (2014.01) |
| *A63F 13/533* | (2014.01) |
| *A63F 13/537* | (2014.01) |
| *A63F 13/5372* | (2014.01) |
| *A63F 13/55* | (2014.01) |
| *A63F 13/822* | (2014.01) |
| *A63F 13/837* | (2014.01) |
| *G06F 3/04815* | (2022.01) |
| *G06F 3/0482* | (2013.01) |
| *G06F 3/04847* | (2022.01) |
| *G06F 3/0488* | (2022.01) |

(52) U.S. Cl.
CPC .......... *G06F 3/0482* (2013.01); *G06F 3/0488* (2013.01); *A63F 13/2145* (2014.09); *A63F 13/426* (2014.09); *A63F 13/50* (2014.09); *A63F 13/52* (2014.09); *A63F 13/533* (2014.09); *A63F 13/537* (2014.09); *A63F 13/55* (2014.09); *A63F 13/822* (2014.09); *A63F 13/837* (2014.09); *A63F 2300/308* (2013.01); *G06F 3/04815* (2013.01); *G06F 3/04847* (2013.01)

(58) Field of Classification Search
CPC ................ A63F 13/2145; A63F 13/837; A63F 2300/308; A63F 13/426; A63F 13/533; A63F 13/537; A63F 13/822; G06F 3/0484; G06F 3/0482; G06F 3/0488; G06F 3/04815; G06F 3/04842; G06F 3/04847
See application file for complete search history.

(56) References Cited

U.S. PATENT DOCUMENTS

| | | | |
|---|---|---|---|
| 2018/0292952 A1* | 10/2018 | Norman | .............. G06F 3/04842 |
| 2020/0334886 A1 | 10/2020 | Mitchell | |
| 2021/0291054 A1 | 9/2021 | Tian et al. | |

FOREIGN PATENT DOCUMENTS

| | | | | |
|---|---|---|---|---|
| CN | 110270098 A | | 9/2019 | |
| CN | 111744176 A | * | 10/2020 | ............. A63F 13/42 |
| CN | 112023392 A | | 12/2020 | |
| CN | 112121431 A | | 12/2020 | |
| CN | 113289336 A | | 8/2021 | |

OTHER PUBLICATIONS

Xu et al., ("RegionalSliding: Facilitating small target selection with marking menu for one-handed thumb use on touchscreen-based mobile devices" Published 2014 by Elsevier B.V. (16 pages) (Year: 2014).*

Yadi et al., ("Call of Duty Video Games" Published 2010 by UMI 3432149 and ProQuest (201 pages) (Year: 2010).*

Japanese Office Action with English translation, Jul. 23, 2024, pp. 1-8, issued in Japanese Application No. 2023-558238.

International Search Report and Written Opinion for PCT/CN2022/092178 mailed Aug. 15, 2022 including translation of Search Report and Written Opinion (15 pages).

Chinese Office Action for Chinese Patent Application No. 2021106425414 dated Oct. 18, 2022 including an English Concise Explanation (9 pages).

* cited by examiner

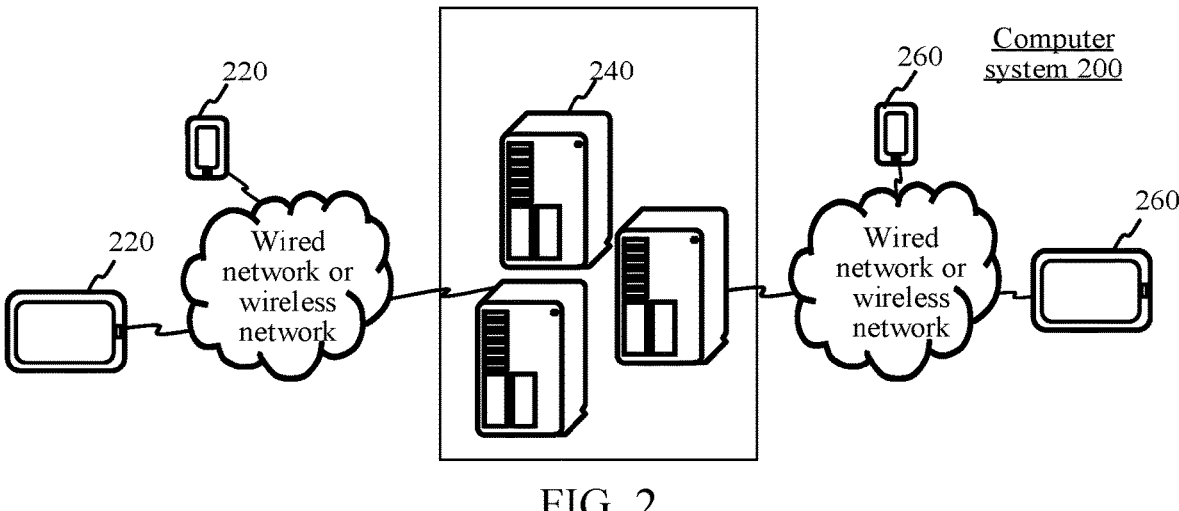

FIG. 2

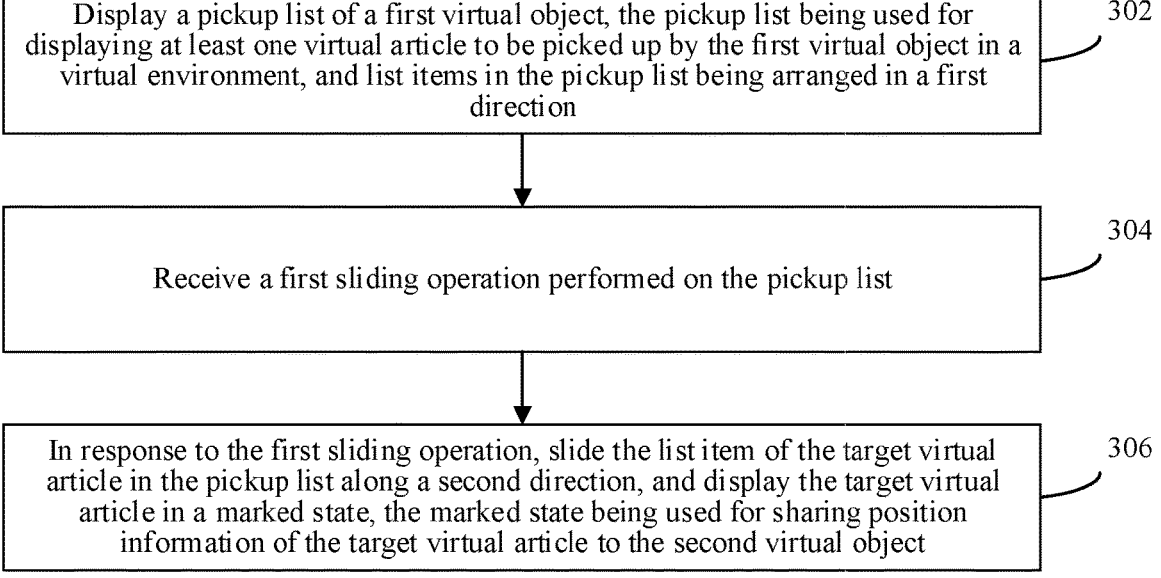

| |
|---|
| Display a pickup list of a first virtual object, the pickup list being used for displaying at least one virtual article to be picked up by the first virtual object in a virtual environment, and list items in the pickup list being arranged in a first direction |

302

| |
|---|
| Receive a first sliding operation performed on the pickup list |

304

| |
|---|
| In response to the first sliding operation, slide the list item of the target virtual article in the pickup list along a second direction, and display the target virtual article in a marked state, the marked state being used for sharing position information of the target virtual article to the second virtual object |

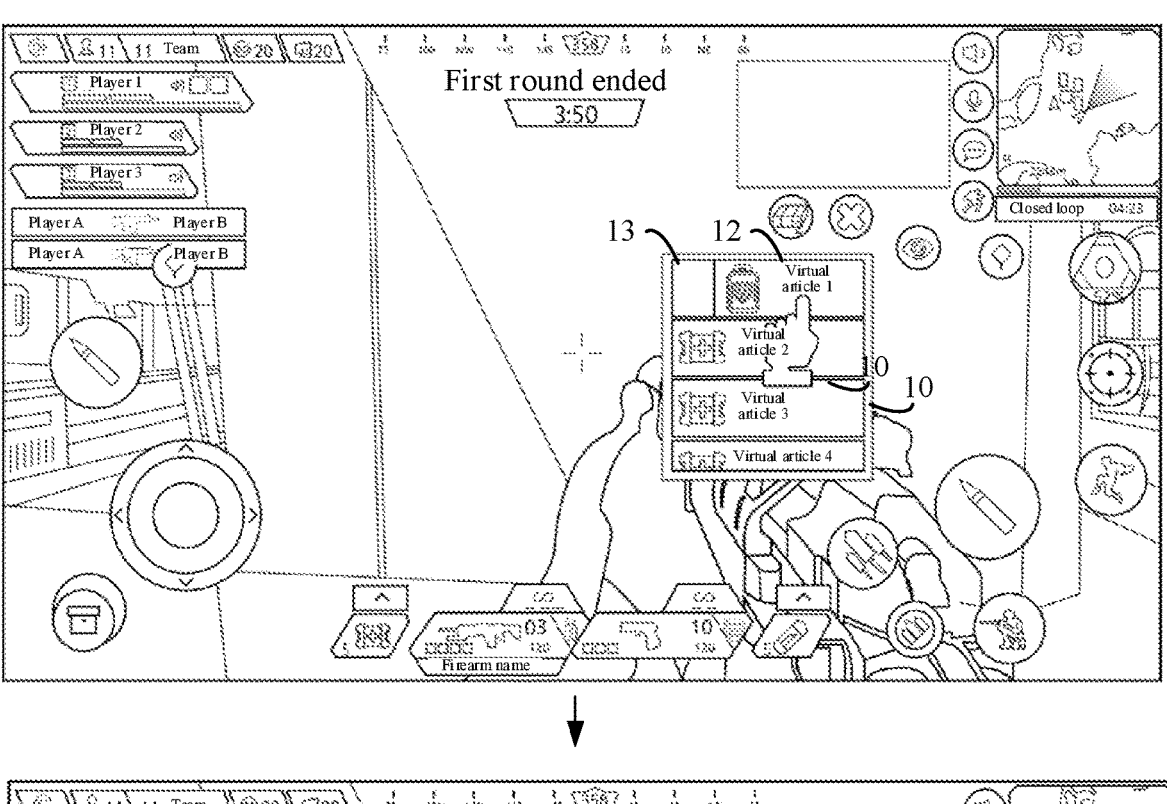
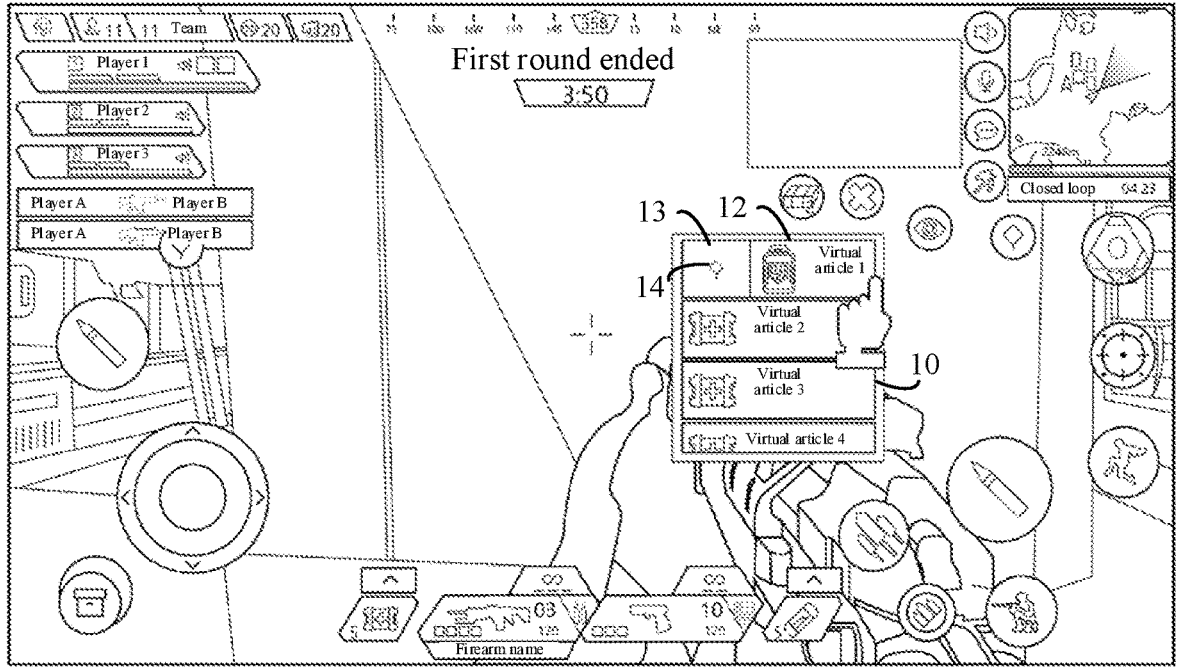
FIG. 9

METHOD AND APPARATUS FOR MARKING ARTICLES IN VIRTUAL ENVIRONMENT, DEVICE AND STORAGE MEDIUM

RELATED APPLICATION

This application is a continuation of International Application No. PCT/CN2022/092178, which claims priority to Chinese Patent Application No. 202110642541.4 filed on Jun. 9, 2021 and entitled "METHOD AND APPARATUS FOR MARKING ARTICLES IN VIRTUAL ENVIRONMENT, DEVICE AND STORAGE MEDIUM". The contents of International Application No. PCT/CN2022/092178 and Chinese Patent Application No. 202110642541.4 are each incorporated herein by reference in their entirety.

FIELD OF THE TECHNOLOGY

This application relates to the field of human-computer interaction, and in particular, to a method and apparatus for marking articles in a virtual environment, a device and a storage medium.

BACKGROUND OF THE DISCLOSURE

There are many applications with virtual environments on terminal devices such as smartphones and tablet computers, such as, a virtual reality application, a three-dimensional map program, a first-person shooting game, and a multiplayer online battle arena.

In the above applications, each user can control one virtual character. The virtual character can mark a certain virtual article on the ground in the virtual environment to share position information of the virtual article with teammates. The specific marking mode includes: aiming a front sight of a firearm of the virtual character at the virtual article on the ground, then selecting a shortcut message "Here is xx virtual article" corresponding to the virtual article in a message sending box, clicking a sending button to mark the virtual article, and sending the shortcut message to the teammates.

However, the above operations depend on aiming of the front sight of the firearm at the virtual article on the ground, and the aiming at the virtual article is time-consuming, which affects the marking efficiency of the virtual articles.

SUMMARY

Embodiments of this application provide a method and apparatus for marking articles in a virtual environment, a device and a storage medium. The method improves the marking efficiency for virtual articles. The technical solution is as follows.

According to one aspect of this application, a method for marking virtual articles in a virtual environment is provided. The method is performed by a terminal device and includes:

displaying a pickup list of the first virtual object, where the pickup list is used for displaying at least one virtual article to be picked up by the first virtual object in the virtual environment, and list items in the pickup list are arranged in a first direction;

receiving a first sliding operation on the pickup list, the first sliding operation being an operation for a list item of a target virtual article in the at least one virtual article; and sliding a list item of the target virtual article in the pickup list in a second direction in response to the first sliding operation, and displaying the target virtual article in a marked state for sharing position information of the target virtual article to a second virtual object.

The first direction is perpendicular to the second direction.

According to one aspect of this application, an apparatus for marking virtual articles in a virtual environment is provided, including:

a display module, configured to display a pickup list of the first virtual object, where the pickup list is used for displaying at least one virtual article to be picked up by the first virtual object in the virtual environment, and list items in the pickup list are arranged in a first direction;

an input module, configured to receive a first sliding operation on the pickup list, the first sliding operation being an operation for a list item of a target virtual article in the at least one virtual article; and a marking module, configured to slide a list item of the target virtual article in the pickup list in a second direction in response to the first sliding operation, and display the target virtual article in a marked state, the marked state being used for sharing position information of the target virtual article to a second virtual object.

The first direction is perpendicular to the second direction.

According to another aspect of this application, a computer device is provided, including: a processor and a memory, where the memory stores at least one instruction, at least one program, a code set, or an instruction set, the at least one instruction, the at least one program, the code set, or the instruction set being loaded and executed by the processor to implement the method for marking virtual articles in a virtual environment described in the above aspect.

According to another aspect of this application, a computer storage medium is provided. The computer storage medium stores at least one program code. The program code is loaded and executed by a processor to implement the method for marking virtual articles in a virtual environment described in the above aspect.

According to another aspect of this application, a computer program product or a computer program is provided. The computer program product or the computer program includes computer instructions stored in a computer-readable storage medium. A processor of the computer device reads the computer instructions from the computer-readable storage medium and executes the computer instructions to cause the computer device to perform the method for marking virtual articles in a virtual environment described in the above aspect.

The technical solutions provided in the embodiments of this application include at least the following beneficial effects:

Taking the first direction as a longitudinal direction and the second direction as a transverse direction as an example, in event that a pickup list sliding along the longitudinal direction is displayed, a target virtual article is quickly marked if a sliding operation of a user sliding along the transverse direction is received. It is unnecessary to additionally control the front sight of the firearm of the first virtual object in the marking process, which realizes a rapid marking solution based on the pickup list and improves the marking efficiency for the virtual articles.

Moreover, because the width of the list items of the target virtual article in the pickup list is usually larger than the display width of the target virtual article in the virtual environment, this solution can also reduce the possibility of accidental touch and improve the accuracy of human-computer interaction in marking the virtual articles, further improving the marking efficiency for the virtual articles.

BRIEF DESCRIPTION OF THE DRAWINGS

FIG. 2 is a schematic structural diagram of a computer system according to an embodiment of this application.

FIG. 3 is a flowchart of a method for marking a virtual article in a virtual environment according to an embodiment of this application.

FIG. 9 is an interface diagram of a method for marking a virtual article in a virtual environment according to an embodiment of this application.

DESCRIPTION OF EMBODIMENTS

Figure 1:
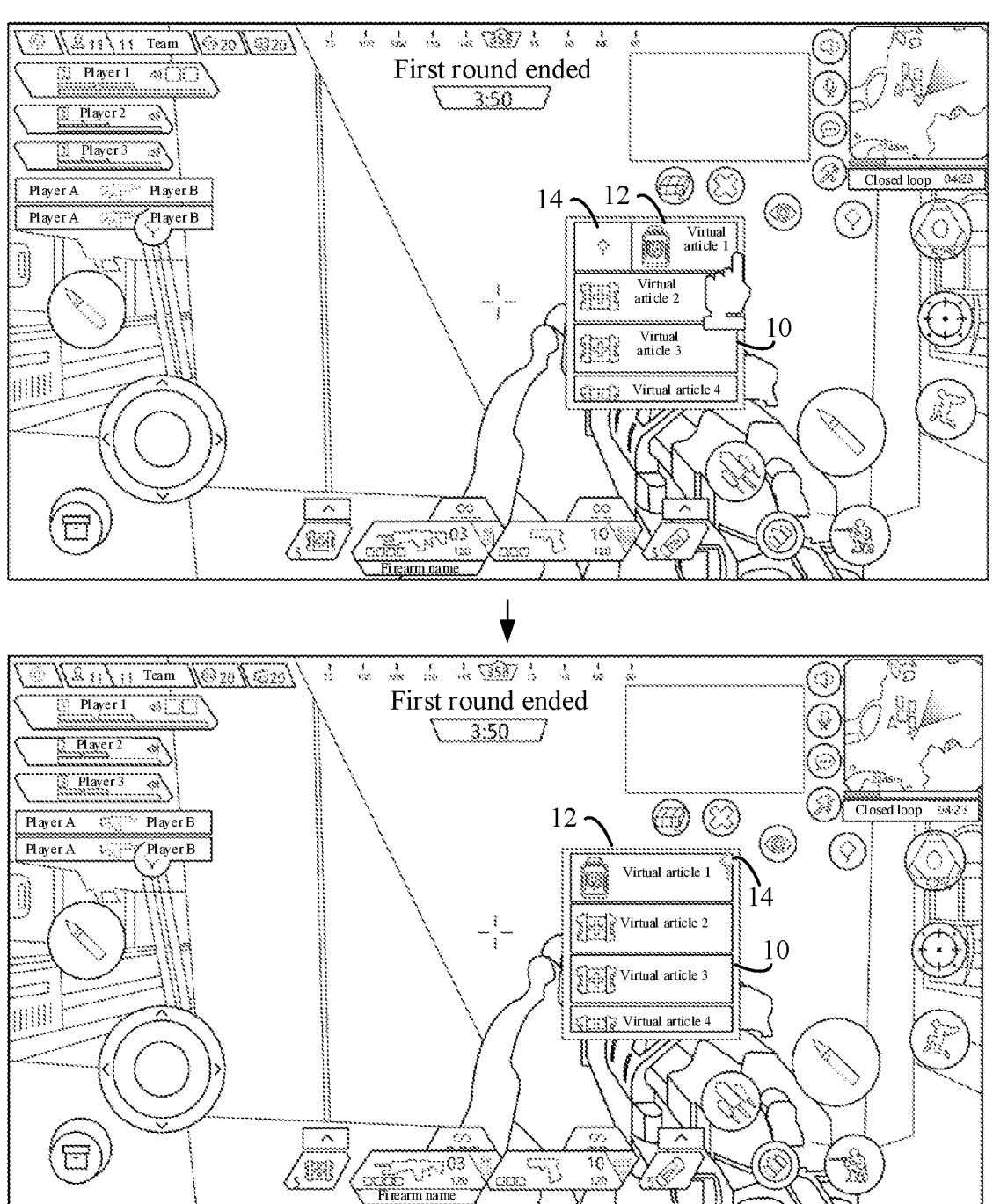
FIG. 1 is an interface diagram of a method for marking a virtual article in a virtual environment according to an embodiment of this application.

To make the objectives, technical solutions, and advantages of this application clearer, the following further describes implementations of this application in detail with reference to the accompanying drawings.

First, terms involved in the embodiments of this application are introduced as follows:

Virtual environment: the virtual environment is a virtual environment displayed (or provided) when an application runs on a terminal. The virtual environment may be a simulated environment of the real world, or may be a semi-simulated semi-fictional three-dimensional (3D) environment, or may be an entirely fictional 3D environment. The virtual environment may be any one of a 2D virtual environment, 2.5D virtual environment, and 3D virtual environment; for the virtual environment to be the 3D virtual environment is exemplified in the following embodiment, but it is not limited thereto. The virtual environment is further used for a virtual environment battle performed between at least two virtual roles.

Virtual object: the virtual object refers to a movable object in a virtual environment. The movable object may be a virtual character, a virtual animal, or a cartoon character, such as a character, an animal, a plant, an oil drum, a wall, or a stone displayed in a virtual environment. Optionally, the virtual object is a three-dimensional model created based on a skeletal animation technology. Each virtual object has a shape and a volume in the virtual environment, and occupies some space in the virtual environment.

Virtual article: the virtual article refers to an immobile object in a virtual environment. The virtual object may be a part of the virtual environment. In some embodiments, the virtual article may be a functional article, for example, the virtual article is an article (such as body armor, helmet, weapon, medical kit, etc.) that can help the virtual object controlled by the user (or the team in which the virtual object is located) to enhance the competitiveness of the game. In some embodiments, the virtual article may be a decorative article, for example, the virtual article may be an ornament for decorating the virtual object skin, coat, shoe, headdress, necklace, etc. The virtual article can also be an article for decorating other virtual articles, such as car lights, ribbons, etc. for decorating cars.

Ground coordinate system: In event that the virtual environment is a three-dimensional virtual environment, the three-dimensional virtual environment has a ground coordinate system which is used for measuring parameters such as coordinates, a direction vector, and a motion vector of a virtual object in the three-dimensional virtual environment, and generally, the ground coordinate system includes three coordinate axes: X-axis, Y-axis, and Z-axis. Optionally, a plane on which the X-axis and the Z-axis are located is a horizontal plane, that is, a reference plane, and an upper semi-axis of the Y-axis represents a height relative to the ground. Posture parameters of the virtual objects in the three-dimensional virtual environment include: three-dimensional coordinates (X, Y, Z), where X and Z represent the coordinates of the virtual object relative to the ground, and Y represents the height of the virtual object relative to the ground. Optionally, the posture parameters of the virtual objects in the three-dimensional virtual environment further include: a pitch angle, a yaw angle, a roll angle and so on.

Pickup list: the pickup list is used for displaying a list of virtual articles to be picked up around a virtual object (for example, within 15 meters).

Mark: after a certain virtual article is marked, the position information of the virtual article may be shared with other virtual objects, for example, after a medical kit is marked, the position information of the medical kit may be shared with teammates.

FIG. 1 is a schematic interface diagram of a process for marking a virtual article based on a pickup list 10 according to an embodiment of this application. A user controls a virtual object to move in the virtual environment. In a case that the virtual object is moved to a certain place in the virtual environment and there are virtual objects to be picked up on the surrounding ground in the virtual environment, a pickup list 10 is displayed on the client, and list items of a plurality of virtual objects to be picked up are displayed in the pickup list 10, and the list items of the plurality of virtual objects are arranged longitudinally.

If the user wishes to mark the virtual article 1, the user may slide laterally (for example, horizontally to the right or horizontally to the left) the list item 12 of the virtual article 1 in the pickup list 10, and after sliding laterally for a short distance, the virtual article 1 may be set to the marked state. On the one hand, a marking icon 14 is displayed on the list item of the virtual article 1, which indicates to the user that the virtual article 1 is in a marked state. On the other hand, a marking buoy is displayed on the virtual article 1 located in the virtual environment, and the marking buoy is used for sharing the position information of the virtual article 1 with teammates. Even if there is an obstacle between the teammate and the virtual article 1, the virtual article 1 may be observed by the teammate penetrating the obstacle.

If the user wishes to pick up the virtual article 1, the user may trigger the list items of the virtual article 1 by using a trigger operation, such as click, double click or long press.

FIG. 2 is a structural block diagram of a computer system according to an exemplary embodiment of this application. The computer system 200 includes: a first terminal device 220, a server 240, and a second terminal device 260.

An application (also called the client) supporting a virtual environment is installed and run on the first terminal device 220. The application 14 may be any one of a virtual reality application, a three-dimensional map program, a First-Person Shooting (FPS) game, a Multiplayer Online Battle Arena (MOBA) game, and a multiplayer gunfight survival game. The first terminal device 220 may be a terminal device used by a first user, and the first user uses the first terminal device 220 to operate a first virtual object in the virtual environment to move. The movement includes, but is not limited to: at least one of adjusting body postures, crawling, walking, running, riding, jumping, driving, picking, shooting, attacking, and throwing. For example, the first virtual object is a first virtual character such as a simulated character role or a cartoon character role.

The first terminal device 220 is connected to the server 240 through a wireless network or a wired network.

The server 240 includes at least one of one server, a plurality of servers, a cloud computing platform, and a virtualization center. The server 240 is configured to provide a back-end service for an application supporting a virtual environment. Optionally, the server 240 is responsible for primary computing work, and the first terminal device 220 and the second terminal device 260 are responsible for secondary computing work. Alternatively, the server 240 is responsible for secondary computing work, and the first terminal device 220 and the second terminal device 260 are responsible for primary computing work. Alternatively, the server 240, the first terminal device 220, and the second terminal device 260 perform collaborative computing by using a distributed computing architecture among each other.

An application supporting a virtual environment is installed and run on the second terminal device 260. The application may be any one of a virtual reality application, a three-dimensional map program, an FPS game, a MOBA game, and a multiplayer shooting survival game. The second terminal device 260 is a terminal device used by a second user 102, and the second user uses the second terminal device 260 to control a second virtual object located in the virtual environment to move. The movement includes, but is not limited to: at least one of adjusting body postures, crawling, walking, running, riding, jumping, driving, picking, shooting, attacking, and throwing. For example, the second virtual object is a second virtual character, such as a simulated person role or a cartoon character role.

Optionally, the first virtual character and the second virtual character are located in the same virtual environment, e.g., the same virtual environment for battle among a plurality of virtual characters. Optionally, the first virtual character and the second virtual character may belong to the same team or the same organization, have a friend relationship, or have a temporary communication permission.

Optionally, the applications installed on the first terminal device 220 and the second terminal device 260 are the same, or the applications installed on the two terminal devices are the same type of applications on different operating system platforms. The first terminal device 220 may generally refer to one of a plurality of terminal devices, the second terminal device 260 may generally refer to one of a plurality of terminal devices. In this embodiment, a description is made by taking only the first terminal device 220 and the second terminal device 260 as an example. The device types of the first terminal device 220 and the second terminal device 260 are the same or different. The device types include: at least one of a smartphone, a tablet computer, an e-book reader, an MP3 player, an MP4 player, a laptop portable computer, and a desk computer. The following embodiment is described by taking the terminal including a smartphone as an example.

A person skilled in the art may learn that there may be more or fewer terminal devices. For example, there may be only one terminal device, or there may be dozens of or hundreds of terminal devices or more. The quantity and the device type of the terminal devices are not limited in this embodiment of this application.

FIG. 3 illustrates a flowchart of a method for picking up a virtual article in a virtual environment according to an exemplary embodiment of this application. This embodiment is exemplified by applying the method to the terminal device or a client in the terminal device or applications in the terminal device. The terminal device may be a first terminal device or a second terminal device as shown in FIG. 1. The method includes the following steps (302-306):

Step 302: Display a pickup list of a first virtual object. The pickup list is used for displaying at least one virtual article to be picked up by the first virtual object in a virtual environment. List items in the pickup list are arranged in a first direction.

In some embodiments, the pickup list is used for displaying items near the first virtual object. The items near the first virtual object refer to virtual articles with the distance between the first virtual objects smaller than or equal to the distance threshold. Optionally, the virtual articles displayed in the pickup list are virtual articles to be picked up by the virtual object.

A user controls the first virtual object to move in the virtual environment. There is a virtual article to be picked up in a certain place or room in the virtual environment. After the user controls the first virtual object to move to the place or room in the virtual environment, the pickup list of the first virtual object is displayed.

For example, the pickup list is automatically popped up and displayed if a distance between the virtual article to be picked up and the first virtual object is smaller than a distance threshold. Alternatively, if the user manually triggers an open entry of the pickup list, the pickup list is popped up and displayed.

The pickup list is used for displaying at least one virtual article to be picked up by the first virtual object in the virtual environment. Optionally, the distance between the virtual article in the pickup list and the first virtual object is smaller than the distance threshold. Optionally the virtual article in the pickup list is a virtual article that the first virtual object has the pickup permission.

If there are a plurality of virtual articles, a plurality of list items in the pickup list are arranged in the first direction, and each list item corresponds to one or one type of virtual article. The sorting mode among the plurality of virtual articles may be arranging by distance, or by value, or by demand matching degree with the first virtual object. For example, if the first virtual object does not have a helmet prop, helmet items are sorted in the first place; alternatively, if the first virtual object is in an injured state, a medical kit is sorted in the first place.

Optionally the pickup list is used for displaying the virtual article to be picked up, such as virtual articles to be picked up by the first virtual object and/or to be picked up by virtual objects other than the first virtual object.

The virtual article in the pickup list may be the item to be picked up by the first virtual object, and in some embodiments, the virtual article in the pickup list may also be the virtual article that the first virtual object can view item information but cannot pick up. In some embodiments, the first direction may be lateral or longitudinal (also referred to as a horizontal direction or a vertical direction), that is, the pickup list may arrange the list items into a row or a column in accordance with the lateral direction (i.e., left and right arrangement), longitudinal direction (up and down arrangement) and other linear directions.

In some embodiments, the pickup list may be a table in which the list items are arranged laterally (i.e., left and right arrangement) or longitudinally (up and down arrangement) into multiple rows and columns, such as two rows and multiple columns, and two columns and multiple rows.

In some embodiments, the arrangement direction (i.e., the first direction) of the list items of the pickup list may also be not a straight direction, but a fan-shaped direction arranged along an arc or a circle, or other directions, which is not specifically limited in the embodiments of this application.

Step 304: Receive a first sliding operation on the pickup list.

In some embodiments, the first sliding operation is an operation for list items of a target virtual article in at least one virtual article. The target virtual article may be one virtual article or a plurality of virtual articles, which is not specifically limited in the embodiments of this application. There is one or a plurality of list items corresponding to the target virtual article, which is not specifically limited in the embodiments of this application. For example, a certain list item in the pickup list is used for displaying a certain virtual article, and the first sliding operation is a sliding operation for the list item (i.e., for the virtual article) in the pickup list. For another example, each list item in the pickup list is used for displaying at least one virtual article, the first sliding operation is a sliding operation for a plurality of list items in the pickup list, and then a plurality of virtual articles corresponding to the plurality of list items are the target virtual articles. For another example, for part or all of the list items in the pickup list, a plurality of virtual articles may be displayed in one list item. The first sliding operation is a sliding operation for one of the list items, and then the target virtual articles are a plurality of virtual articles displayed in the list item.

In some embodiments, a width of the list item corresponding to the target virtual article is larger than a display width of the target virtual article in the virtual environment. In some embodiments, the target virtual object is a virtual object slid by the first sliding operation in at least one virtual article.

A sliding direction of the first sliding operation is perpendicular to or approximately perpendicular to the first direction. Schematically, in a case that the list items in the pickup list are arranged in a longitudinal direction, the sliding direction of the first sliding operation is lateral or approximately lateral. In event that the list items in the pickup list are arranged laterally, the sliding direction of the first sliding operation is longitudinal or approximately longitudinal.

In some embodiments, the sliding direction of the first sliding operation is longitudinal when the pickup list is two rows and multiple columns. For example, for the list items in the last row, the sliding direction of the first sliding operation is upward. For the list items in the next row, the sliding direction of the first sliding operation is downward. In some embodiments, in event that the pickup list has two rows and multiple columns, the sliding direction of the first sliding operation is longitudinal, regardless of the list items of the last row or the list items of the next row. That is, the sliding direction of the first sliding operation may be upward or downward.

In some embodiments, in event that the pickup list has two columns and multiple rows, the sliding direction of the first sliding operation is lateral. For example, for the list items in the left row, the sliding direction of the first sliding operation is leftward. For the list items in the right row, the sliding direction of the first sliding operation is rightward. In some embodiments, in event that the pickup list has two columns and multiple rows, the sliding direction of the first sliding operation is lateral, regardless of the list items of the left row or the list items of the right row. That is, the sliding direction of the first sliding operation may be leftward or rightward.

In some embodiments, regardless of the shape and arrangement of the list items, the sliding direction of the first sliding operation conforms to a preset sliding condition, and the sliding direction of the first sliding operation is independent of the shape and arrangement of the list items. For example, if the list items are arranged in a circular shape, the corresponding virtual articles in the list items may also be marked by lateral or longitudinal sliding operations.

Step 306: In response to the first sliding operation, slide the list item of the target virtual article in the pickup list along a second direction, and display the target virtual article in a marked state, the marked state being used for sharing position information of the target virtual article to the second virtual object.

In some embodiments, the second virtual object is a teammate of the first virtual object; and/or, the second virtual object is a virtual object in the same game as the first virtual object. By setting the target virtual article to the marked state, the second virtual object (a corresponding user) can determine the position of the target virtual article by viewing the mark of the target virtual article, and then find and pick up the target virtual article.

In some embodiments, the position information of the target virtual article includes coordinates of the target virtual article in the terrestrial coordinate system.

In some embodiments, the marked state is configured to indicate the position of the target virtual article for the first virtual object (corresponding user). For example, for some virtual articles with pickup conditions (for example, only virtual objects with medical attributes or healing attributes can pick up specific medical supplies), if the first virtual object does not meet the pickup conditions of the virtual article, the first virtual object cannot pick up the virtual article, but can view the information of the virtual article through the pickup list, and mark the position of the virtual article. After the first virtual object meets the pickup conditions of the virtual article, the virtual article may be picked up, or a teammate meeting the pickup conditions is prompted to pick up the virtual article.

For example, the first direction is perpendicular to the second direction. In a case that the first direction is a vertical direction, the second direction is a horizontal direction; and in event that the first direction is a horizontal direction, the second direction is a vertical direction. Alternatively, in event that the first direction is a lateral direction, the second direction is a longitudinal direction; and in event that the first direction is a longitudinal direction, the second direction is a lateral direction.

In some embodiments, the first direction and the second direction may be not perpendicular to each other. For example, if the first direction is an arc or circumferential direction, the second direction may coincide (or approximately coincide) with a straight line on which the radius of the arc or circumference lies.

In some embodiments, the first direction is parallel to or coincides with the second direction. Additionally, in some embodiments, if the sliding direction of the first sliding operation is the same as or approximately the same as the first direction, the sliding direction (i.e., the second direction) of the list item of the target virtual article is parallel to or coincides with the first direction. For example, if a plurality of list items in the pickup list are arranged laterally (i.e., arranged in the first direction), and the first sliding operation is a lateral sliding operation for the list items of the target virtual articles, the list items of the target virtual articles slide laterally (i.e., are arranged in the second direction), and the target virtual articles are displayed in the marked state.

In view of the above, in the method provided by this embodiment, taking the first direction being a longitudinal direction and the second direction being a lateral direction as an example, when displaying the pickup list of sliding longitudinally, if the sliding operation of the user sliding laterally, the target virtual object may be rapidly marked. It is unnecessary to additionally control the front sight of the firearm of the first virtual object in the marking process, which realizes a rapid marking solution based on the pickup list and improves the marking efficiency for the virtual articles. Moreover, because the width of the list items of the target virtual article in the pickup list is usually larger than the display width of the target virtual article in the virtual environment, this solution can also reduce the possibility of accidental touch and improve the accuracy of human-computer interaction in marking the virtual articles, further improving the marking efficiency for the virtual articles.

Figure 4:
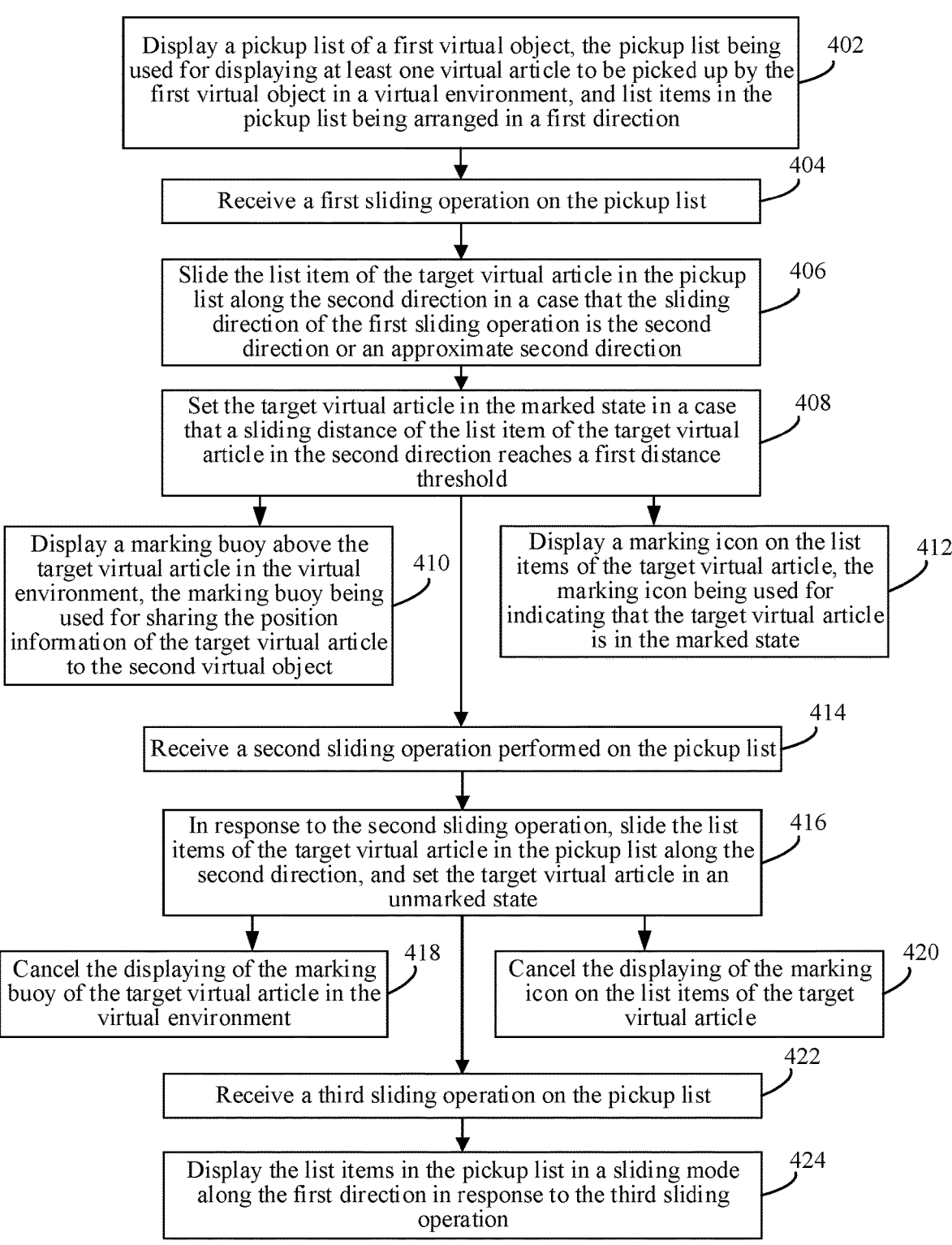
FIG. 4 is a flowchart of a method for marking a virtual article in a virtual environment according to an embodiment of this application.

FIG. 4 illustrates a flowchart of a method for picking up a virtual article in a virtual environment according to an exemplary embodiment of this application. This embodiment is exemplified by applying the method to the terminal device or a client in the terminal device or applications in the terminal device. The terminal device may be a first terminal device or a second terminal device as shown in FIG. 1. The method includes the following steps (402-424):

Step 402: Display a pickup list of a first virtual object. The pickup list is used for displaying at least one virtual article to be picked up by the first virtual object in a virtual environment. List items in the pickup list are arranged in a first direction.

The pickup list is used for displaying at least one virtual article to be picked up by the first virtual object in the virtual environment. In some embodiments, the distance between the virtual article in the pickup list and the first virtual object is smaller than the distance threshold. In some embodiments, the virtual article in the pickup list is a virtual article that the first virtual object has the pickup permission.

If there are a plurality of virtual articles, a plurality of list items in the pickup list are arranged in the first direction, and each list item corresponds to one or one type of virtual article. The sorting mode among a plurality of virtual objects may be arranging by distance, or by value, or by demand matching degree with the first virtual object.

Step 404: Receive a first sliding operation on the pickup list.

A sliding direction of the first sliding operation is perpendicular to or approximately perpendicular to the first direction. Schematically, in event that the list items in the pickup list are arranged in a longitudinal direction, the sliding direction of the first sliding operation is lateral or approximately lateral. In event that the list items in the pickup list are arranged laterally, the sliding direction of the first sliding operation is longitudinal or approximately longitudinal.

In a scenario where the terminal device uses a touch screen for interaction, the first sliding operation is collected or received by the touch screen. In a scenario where the terminal device uses a mouse for interaction, the first sliding operation is collected or received by the mouse. In a scenario where the terminal device uses a handle for interaction, the first sliding operation is collected or received by a touch pad on the handle.

Step 406: Slide the list item of the target virtual article in the pickup list along the second direction in event that the sliding direction of the first sliding operation is the second direction or an approximate second direction.

In event that the sliding direction of the first sliding operation is the second direction or the approximate second direction, following the first sliding operation, the list item of the target virtual article slides in the pickup list along the second direction.

In the process of sliding the list item of the target virtual article, a part located at one end of the list item of the target virtual article that is moved out of the edge of the pickup list may be canceled to display, and a new blank part located at the other end may be added with a display filling color.

In some embodiments, in the process of sliding the list item of the target virtual article, the list item of the target virtual object exceeds a boundary of the pickup list with the first sliding operation.

In the process of determining that the sliding direction of the first sliding operation is the second direction or an approximate second direction, at least one of two different determining modes may be employed.

The first determining mode: In event that an angle between the sliding direction of the first sliding operation and the second direction is smaller than an angle threshold, the list item of the target virtual article slides in the pickup list along the second direction.

The sliding direction of the first sliding operation may be determined by two position points in the sliding trajectory. Provided that there are a preceding position point and a subsequent position point in the sliding trajectory, the direction in which the preceding position point points to the subsequent position point is the sliding direction of the first sliding operation. The preceding position point and the subsequent position point may be two position points which are one frame apart or two position points which are fixed time apart.

Figure 5:
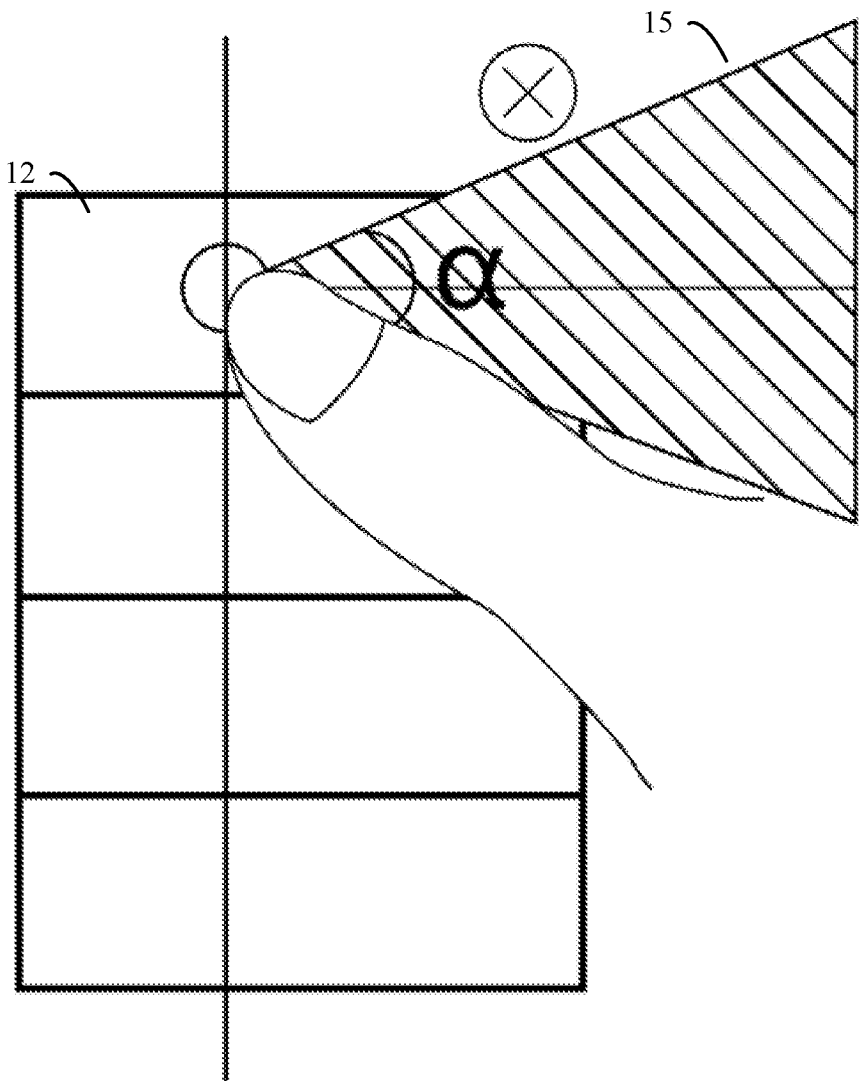
FIG. 5 is an interface diagram of a method for marking a virtual article in a virtual environment according to an embodiment of this application.

As shown in FIG. 5, taking second direction being a horizontal rightward direction as an example, the angle threshold is a. In event that the angle between the sliding direction of the first sliding operation and the horizontal rightward direction is smaller than (or equal to) half (i.e., α/2) of the angle threshold, the sliding direction of the first sliding operation is determined to be the second direction or the approximate second direction, and the list item 12 of the target virtual article slides in the pickup list along the second direction. For example, half of the angle threshold α/2 is 30 degrees, i.e., the angle threshold α is 60 degrees.

The second determining mode: In event that the sliding position in the sliding direction of the first sliding operation is within a sliding range region corresponding to the second direction, the list item of the target virtual article slides in the pickup list along the second direction.

The sliding range region corresponding to the second direction is a sliding range defined by the second direction as the center line and both sides not exceeding the angle threshold.

As shown in FIG. 5, taking the second direction being a horizontal rightward direction as an example, the sliding range region 15 with the angle between the horizontal rightward directions smaller than half of the angle threshold α/2 is set as the sliding range region corresponding to the horizontal rightward direction. In event that the sliding position of the first sliding operation does not exceed the sliding range region 15, the sliding direction of the first sliding operation is determined to be the second direction or the approximate second direction, and the list item 12 of the target virtual article slides in the pickup list along the second direction. The sliding range region 15 may refer to the diagonal shaded region in FIG. 5.

Figure 6:
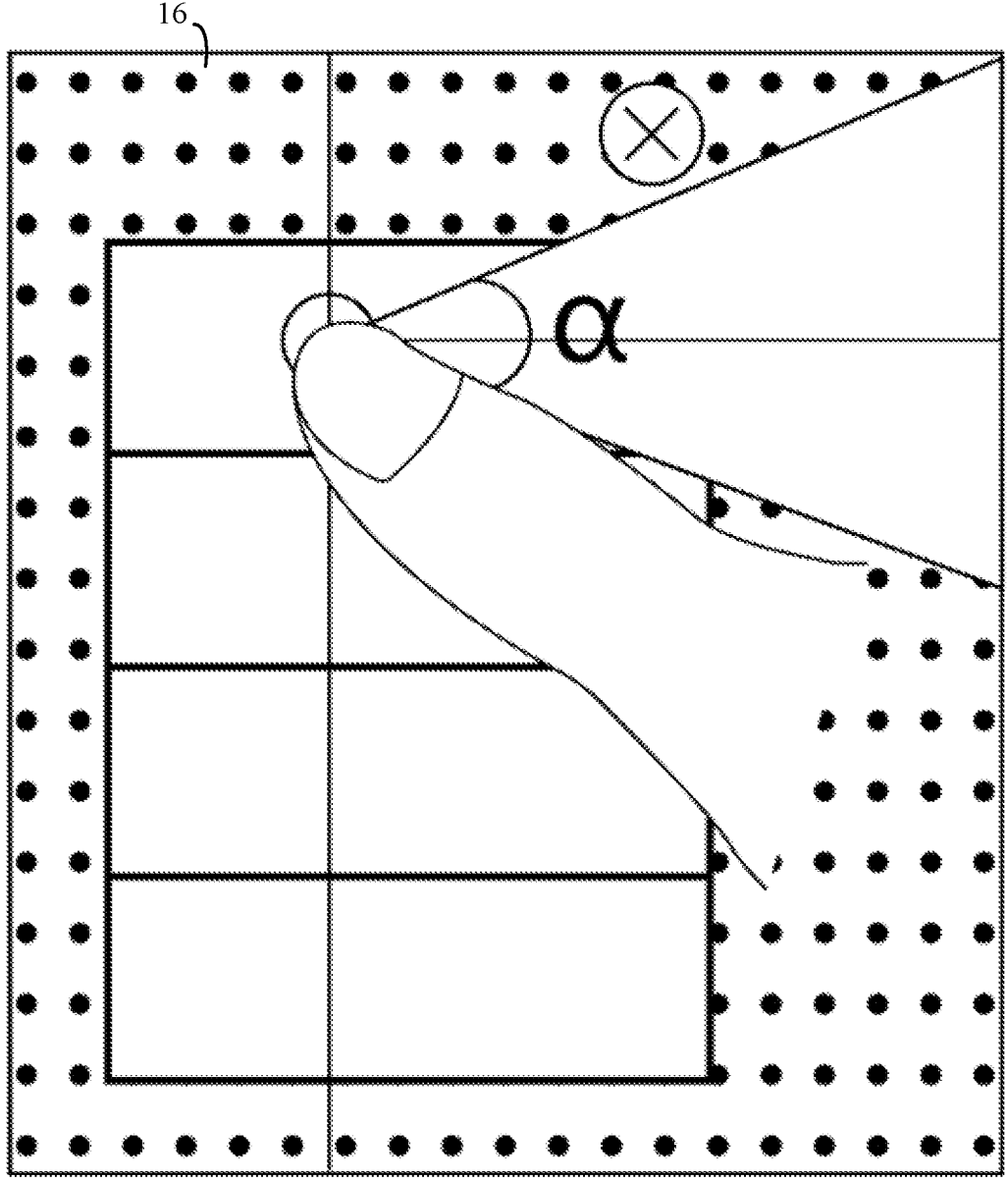
FIG. 6 is an interface diagram of a method for marking a virtual article in a virtual environment according to an embodiment of this application.

Otherwise, as shown in FIG. 6, in event that the sliding position of the first sliding operation exceeds the sliding range region 15 and is located in other sliding range regions 16, the sliding direction of the first sliding operation is determined to be a first direction or an approximate first direction, and the list item in the pickup list slide along the first direction. The sliding range region 16 may refer to a dot-like shaded region in FIG. 6.

In embodiments of this application, by limiting the angle between the sliding direction of the first sliding operation and the second direction within an angle threshold, and/or limiting the sliding position within the sliding range region, the sliding operation in the angle threshold and/or the sliding range region may be counted as an effective operation. Therefore, the sliding direction of the first sliding operation does not need to be completely parallel to or coincide with the second direction, thereby improving the operation convenience. In addition, the sliding direction or the sliding position of the first sliding operation cannot be too biased due to the limitation of the angle threshold and/or the sliding range region, thereby reducing the probability of misoperation.

Step 408: Set the target virtual article in the marked state in a case that a sliding distance of the list item of the target virtual article in the second direction reaches a first distance threshold.

Optionally, in event that the sliding distance of the list item of the target virtual article in the second direction reaches the first distance threshold, the target virtual article is set to the marked state, and the target virtual article is displayed in the marked state. Schematically, the first distance threshold is one-third or half of the length (or width) of the list item of the target virtual article, and the specific size of the first distance threshold is not limited in this application.

Figure 7:
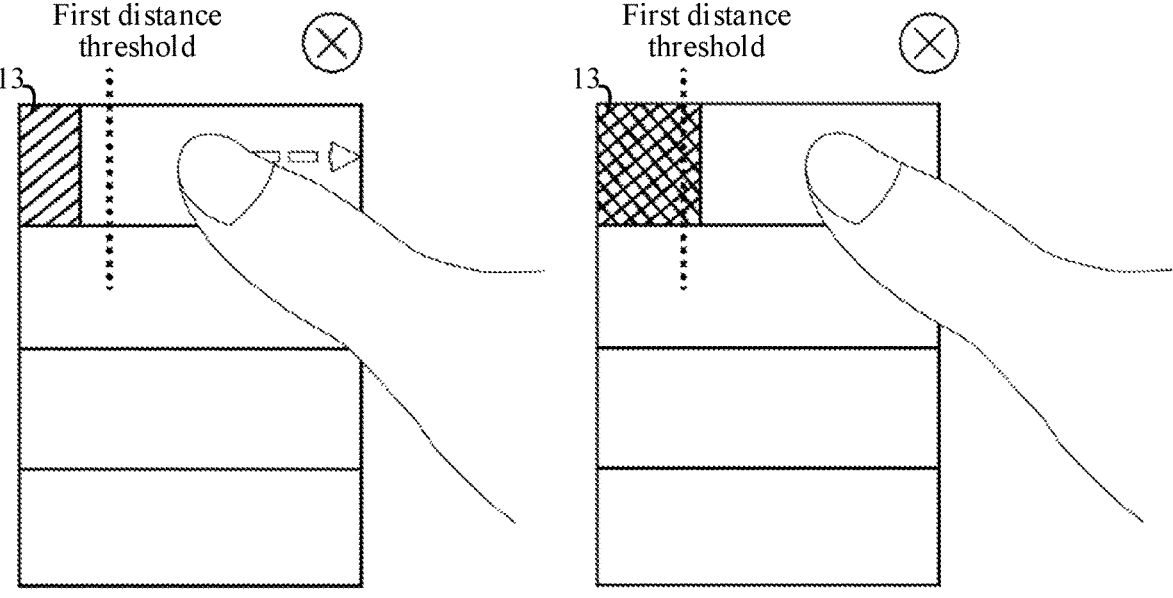
FIG. 7 is an interface diagram of a method for marking a virtual article in a virtual environment according to an embodiment of this application.

Schematically, as shown in FIG. 7, in event that the sliding distance of the list item of the target virtual article in the second direction does not reach the first distance threshold, a filling color block 13 of a first color is displayed on the left side of the list item of the target virtual article, representing that the marking is not successful. In event that the sliding distance of the list item of the target virtual article in the second direction reaches the first distance threshold, the filling color block 13 of a second color is displayed on the left side of the list item of the target virtual article, representing that the marking is successful. In this case, the user releases the first sliding operation and completes the marking of the target virtual article.

It is to be illustrated that, the first distance threshold is a threshold designed to prevent misoperation, and the first distance threshold is an optional design. By adding the first distance threshold as a condition for determining whether or not to mark the virtual article, the abnormal marking caused by user's accidental touch may be reduced, and the accuracy of human-computer interaction may be improved.

Step 410: Display a marking buoy above the target virtual article in the virtual environment, the marking buoy being used for sharing the position information of the target virtual article to the second virtual object.

The marking buoy is displayed above the target virtual article located in the virtual environment at the same time or after the target virtual article is set to the marked state. The marking buoy may be a two-dimensional graphic or a three-dimensional virtual identity. Optionally, the marking buoy may also be displayed at other locations near the target virtual article in the virtual environment, such as on the left side of, right side of, below the target virtual article, etc. The marking buoy may also be overlapped with the target virtual article, which is not specifically limited in the embodiments of this application.

In some embodiments, the distance (e.g., display distance) between the target virtual article located in the virtual environment and the marked state is smaller than or equal to a third distance threshold.

Figure 8:
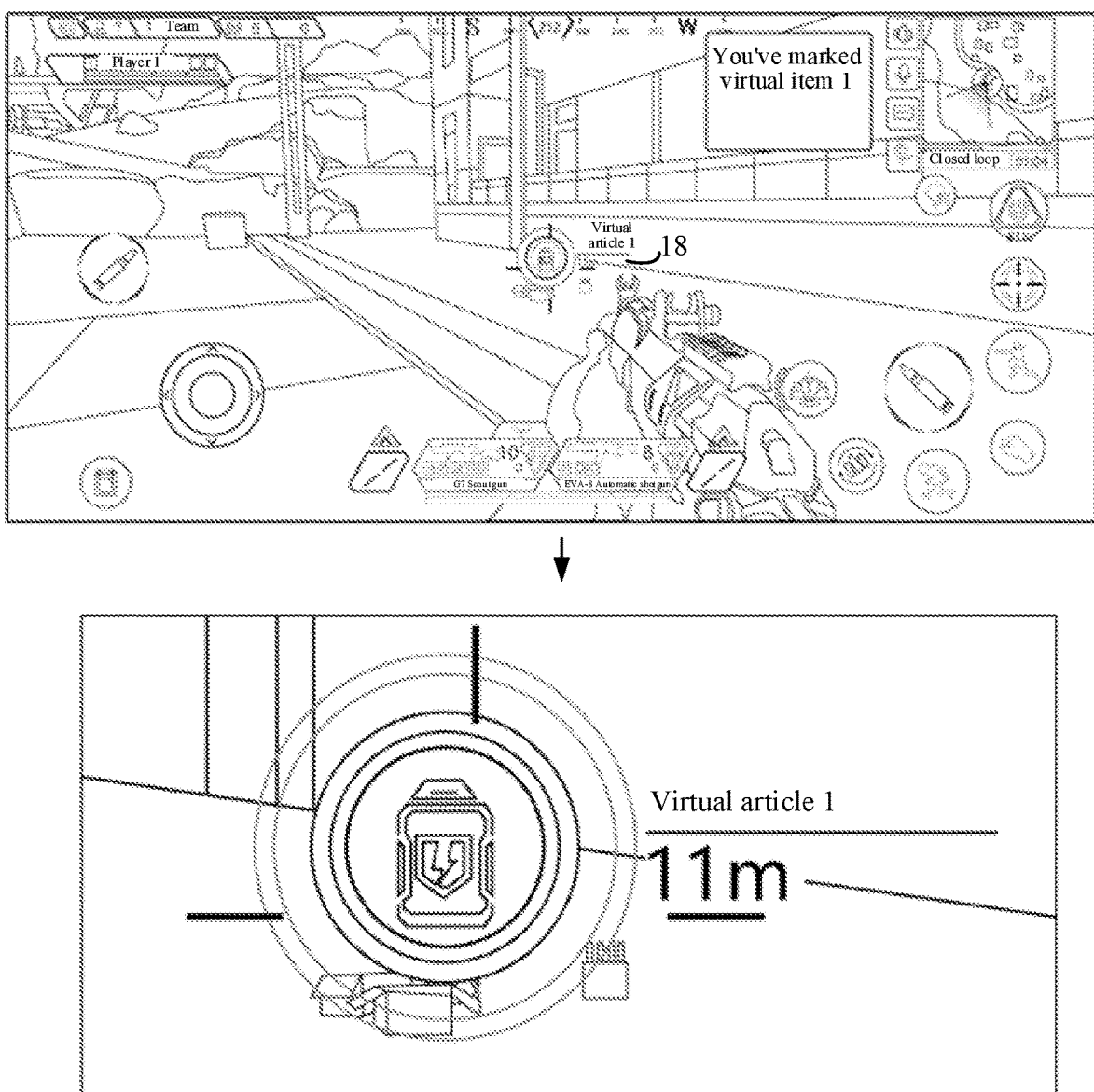
FIG. 8 is an interface diagram of a method for marking a virtual article in a virtual environment according to an embodiment of this application.

Schematically, as shown in FIG. 8, an item name of the target virtual article and a distance between the target virtual article and a virtual object controlled by a user account logged on the client are displayed on the marking buoy 18. On the client corresponding to the first virtual object, the distance is displayed as the distance between the target virtual article and the first virtual object. On the client corresponding to the second virtual object, the distance is the distance between the target virtual article and the second virtual object.

In some embodiments, the marking buoy 18 has a visual property of penetrating obstacles. The marking buoy 18 may be seen on the client of the second virtual object even if there is an obstacle such as a building or a vehicle between the second virtual object and the target virtual article. Therefore, while marking the virtual object, the occlusion of marking buoys to the virtual environment is reduced, and the visual field of users observing the virtual environment is guaranteed as much as possible.

Step 412: Display a marking icon on the list items of the target virtual article, the marking icon being used for indicating that the target virtual article is in the marked state.

At the same time or after the target virtual article is set to the marked state, the marking icon for indicating that the target virtual article is in the marked state is displayed on the list item of the target virtual article in the pickup list.

In some embodiments, the marked state has an effective duration, and the marked state of the target virtual article is canceled after the effective duration is exceeded. Alternatively, after the second virtual object or the first virtual object picks up the target virtual object, the marked state of the target virtual object is canceled.

As shown in the schematic of FIG. 9, in event that the sliding distance of the list item of the target virtual article in the second direction does not reach the first distance threshold, a filling color block 13 of a first color is displayed on the left side of the list item of the target virtual article, representing that the marking is not successful. In event that the sliding distance of the list item of the target virtual article in the second direction reaches the first distance threshold, the filling color block 13 of the second color and the marking icon 14 are displayed on the left side of the list item of the target virtual article, representing that the marking is successful.

In some embodiments, after the user releases the first sliding operation, the displaying of the fill color block 13 is canceled and the marking icon 14 is transferred to the top right of the list item of the target virtual article to be displayed, as shown in FIG. 1.

In this embodiment, by displaying the marking icon on the list items of the virtual article, it indicates that the position of the virtual article is marked. Therefore, the user does not need to check whether the virtual articles have marking buoys one by one in the virtual environment, and only needs to check the marking icons of the virtual articles in the pickup list with the virtual articles displayed centrally. The marked state of the virtual article may be known, and the convenience for the user to confirm the marked state of the virtual article is improved.

Step 414: Receive a second sliding operation performed on the pickup list.

In some embodiments, the second sliding operation is a sliding operation for the list item of the target virtual article.

The sliding direction of the second sliding operation is perpendicular or approximately perpendicular to the first direction. Schematically, in event that the list items in the pickup list are arranged longitudinally, the sliding direction of the second sliding operation is lateral or approximately lateral. In event that the list items in the pickup list are arranged laterally, the sliding direction of the second sliding operation is longitudinal or approximately longitudinal.

In a scenario where the terminal device uses the touch screen for interaction, the second sliding operation is collected or received by the touch screen. In a scenario where the terminal device uses the mouse for interaction, the second sliding operation is collected or received by the mouse. In a scenario where the terminal device uses the handle for interaction, the second sliding operation is collected or received by the touch pad on the handle.

Step 416: In response to the second sliding operation, slide the list items of the target virtual article in the pickup list along the second direction, and set the target virtual article in an unmarked state.

In event that the sliding direction of the second sliding operation is a second direction or an approximate second direction, following the second sliding operation, the list item of the target virtual article slides in the pickup list along the second direction, the target virtual article is set to an unmarked state, and the target virtual article is displayed in an unmarked state.

In the process of determining the sliding direction of the second sliding operation as a second direction or an approximate second direction, at least one of the following two different determining modes may be employed:

The first determining mode: In event that an angle between the sliding direction of the second sliding operation and the second direction is smaller than an angle threshold, the list item of the target virtual article slides in the pickup list along the second direction.

The sliding direction of the second sliding operation may be determined by two position points in the sliding trajectory. Provided that there is a preceding position point and a subsequent position point in the sliding trajectory, the direction in which the preceding position point points to the subsequent position point is the sliding direction of the second sliding operation. The preceding position point and the subsequent position point may be two position points which are one frame apart or two position points which are fixed time apart.

The second determining mode: In event that the sliding position in the sliding direction of the second sliding operation is within the sliding range region corresponding to the second direction, the list item of the target virtual article slides in the pickup list along the second direction.

The sliding range region corresponding to the second direction is a sliding range defined by the second direction as the center line and both sides not exceeding the angle threshold.

Schematically, in event that the sliding direction of the second sliding operation is a second direction or an approximate second direction, following the second sliding operation, the list item of the target virtual article slides in the pickup list along the second direction. In event that the sliding distance of the list item of the target virtual article in the second direction reaches the second distance threshold, the target virtual article is set to an unmarked state.

Schematically, the second distance threshold is one-third or half of the length of the list items of the target virtual article, and the specific size of the second distance threshold is not limited in this application.

It is to be illustrated that, the second distance threshold is a threshold designed to prevent misoperation, and the second distance threshold is an optional design.

It is to be illustrated that, the horizontal direction includes a horizontal rightward direction and a horizontal leftward direction. The sliding directions of the first sliding operation and the second sliding operation may be the same or different (e.g., opposite). For example, the sliding direction of the first sliding operation is the horizontal rightward direction, and the sliding direction of the second sliding operation is also the horizontal rightward direction. For another example, the sliding direction of the first sliding operation is the horizontal rightward direction, and the sliding direction of the second sliding operation is the horizontal leftward direction.

In the embodiment of this application, the virtual article may be changed from the unmarked state to the marked state through a sliding operation, and then the virtual article may be changed from the marked state to the unmarked state through a sliding operation. Therefore, the marked state of the virtual article may be quickly and conveniently switched through the sliding operations, and the convenience of human-computer interactive operation is improved.

Step 418: Cancel the displaying of the marking buoy of the target virtual article in the virtual environment.

In some embodiments, the displaying of a marking buoy over the target virtual article located in the virtual environment is canceled, the marking buoy is used for sharing position information of the target virtual article to the second virtual object.

Optionally, the marking icon is displayed on the list item of the target virtual article in the marked state, i.e., the displaying of the marking icon on the list item of the target virtual article is canceled. In event that the second sliding operation satisfies the condition of canceling the marking, the displaying of the marking icon is canceled on the list items of the target virtual article.

Step 420: Cancel the displaying of the marking icon on the list items of the target virtual article.

Optionally, the marking icon is displayed on the list items of the target virtual article in the marked state. In response to the second sliding operation satisfying the condition of canceling marking, the displaying of the marking icon is canceled on the list items of the target virtual article.

Step 422: Receive a third sliding operation performed on the pickup list.

The sliding direction of the third sliding operation is a first direction or an approximate first direction. Schematically, in event that the list items in the pickup list are arranged longitudinally, the sliding direction of the third sliding operation is a longitudinal direction or an approximate longitudinal direction. In event that the list items in the pickup list are arranged laterally, the sliding direction of the first sliding operation is a lateral direction or an approximate lateral direction.

In a scenario where the terminal device uses the touch screen for interaction, the third sliding operation is collected or received by the touch screen. In a scenario where the terminal device uses the mouse for interaction, the third sliding operation is collected or received by the mouse. In a scenario where the terminal device uses the handle for interaction, the third sliding operation is collected or received by the touch pad on the handle.

Step 424: Display the list items in the pickup list in a sliding mode along the first direction in response to the third sliding operation.

Taking the first direction as a vertical upward direction as an example, the list items in the pickup list are displayed in a sliding mode along the vertical upward direction in response to the third sliding operation in the vertical upward direction. Taking the first direction as a vertical downward direction as an example, the list items in the pickup list are displayed in a sliding/scrolled mode in the vertical downward direction in response to the third sliding operation in the vertical downward direction. That is, by the third sliding operation for the pickup list, the list items in the pickup list are displayed in a scrolled mode without changing the position and size of the display region where the pickup list is located.

Schematically, in event that one list item is only used for displaying one or one type of virtual article, the pickup list displays four or four types of list items of virtual articles to be picked by default (i.e., the pickup list may display up to four list items at the same time). In event that there are more than 4 list items of virtual articles available for pickup, the user can slide the list items in the pickup list using the third sliding operation.

It is to be illustrated that this embodiment is illustrated by taking the second direction being a horizontal rightward direction as an example.

In view of the above, in the method provided by this embodiment, taking the first direction being a longitudinal direction and the second direction being a lateral direction as an example, when displaying the pickup list of sliding longitudinally, if the sliding operation of the user sliding laterally, the target virtual object may be rapidly marked. It is unnecessary to additionally control the front sight of the firearm of the first virtual object in the marking process, which realizes a rapid marking solution based on the pickup list and improves the marking efficiency for the virtual articles. Moreover, because the width of the list items of the target virtual article in the pickup list is usually larger than the display width of the target virtual article in the virtual environment, this solution can also reduce the possibility of accidental touch and improve the accuracy of human-computer interaction.

In the method provided by this embodiment, by adding the first distance threshold and the second distance threshold as the conditions of determining whether to mark or cancel the marking of the virtual article, the abnormal marking caused by the user's accidental touch can be reduced and the accuracy of the human-computer interaction can be improved.

In a specific example, it is assumed that for the list items of the target virtual article on the pickup list, a lateral sliding range region 66 and a longitudinal sliding range region 68 are divided. The lateral sliding range region 66 includes a grid filling region and a slash filling region in FIG. 10, and the longitudinal sliding range region 68 includes a white filling region and a dot matrix filling region in FIG. 10. As shown in FIG. 11, the marking process may include the following steps (01 to 10):

Step 01: Start.

Step 02: A user presses a target virtual article on a pick list to slide.

Step 03: Divide a sliding region according to a preset α value.

The lateral sliding range region 66 and the longitudinal sliding range region 68 are divided according to the preset α value. The lateral sliding range region 66 is an angle region not exceeding ±α/2 in the horizontal direction, and the longitudinal sliding range region 68 is a region other than the lateral sliding range region 66.

Figure 10:
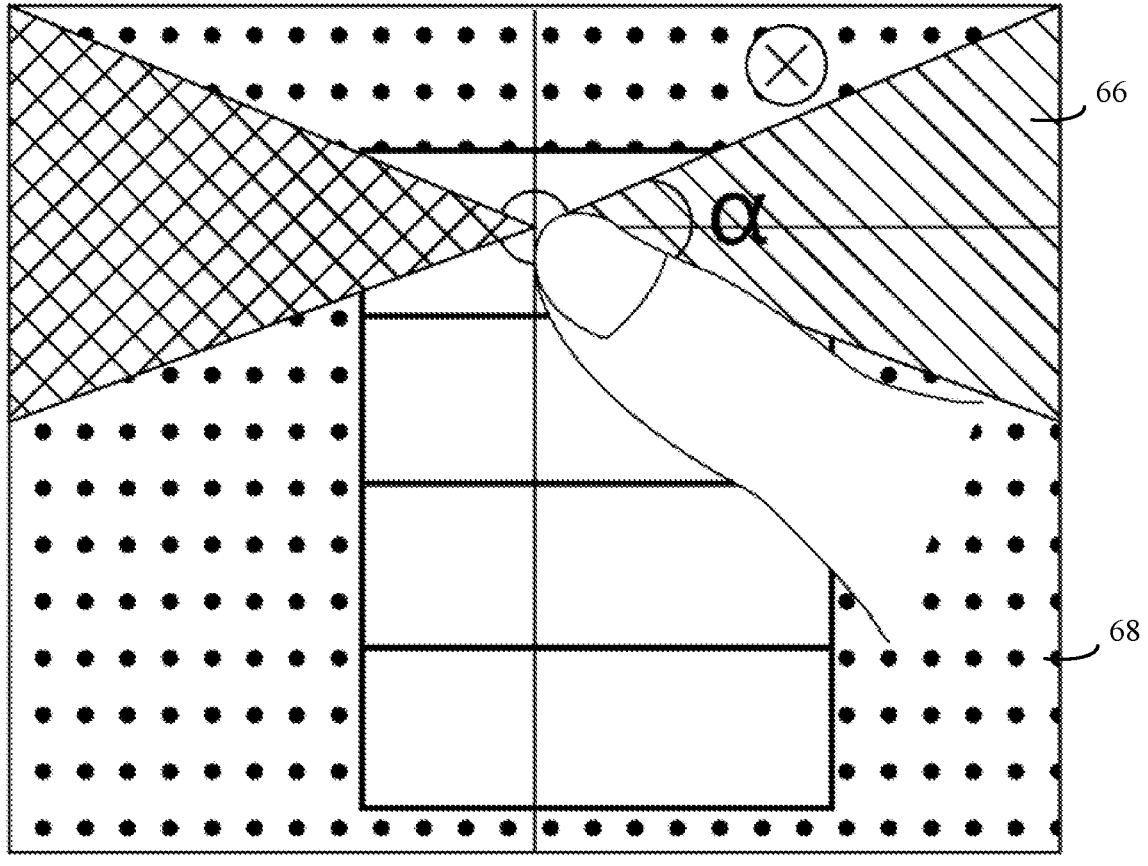
FIG. 10 is an interface diagram of a method for marking a virtual article in a virtual environment according to an embodiment of this application.
Figure 11:
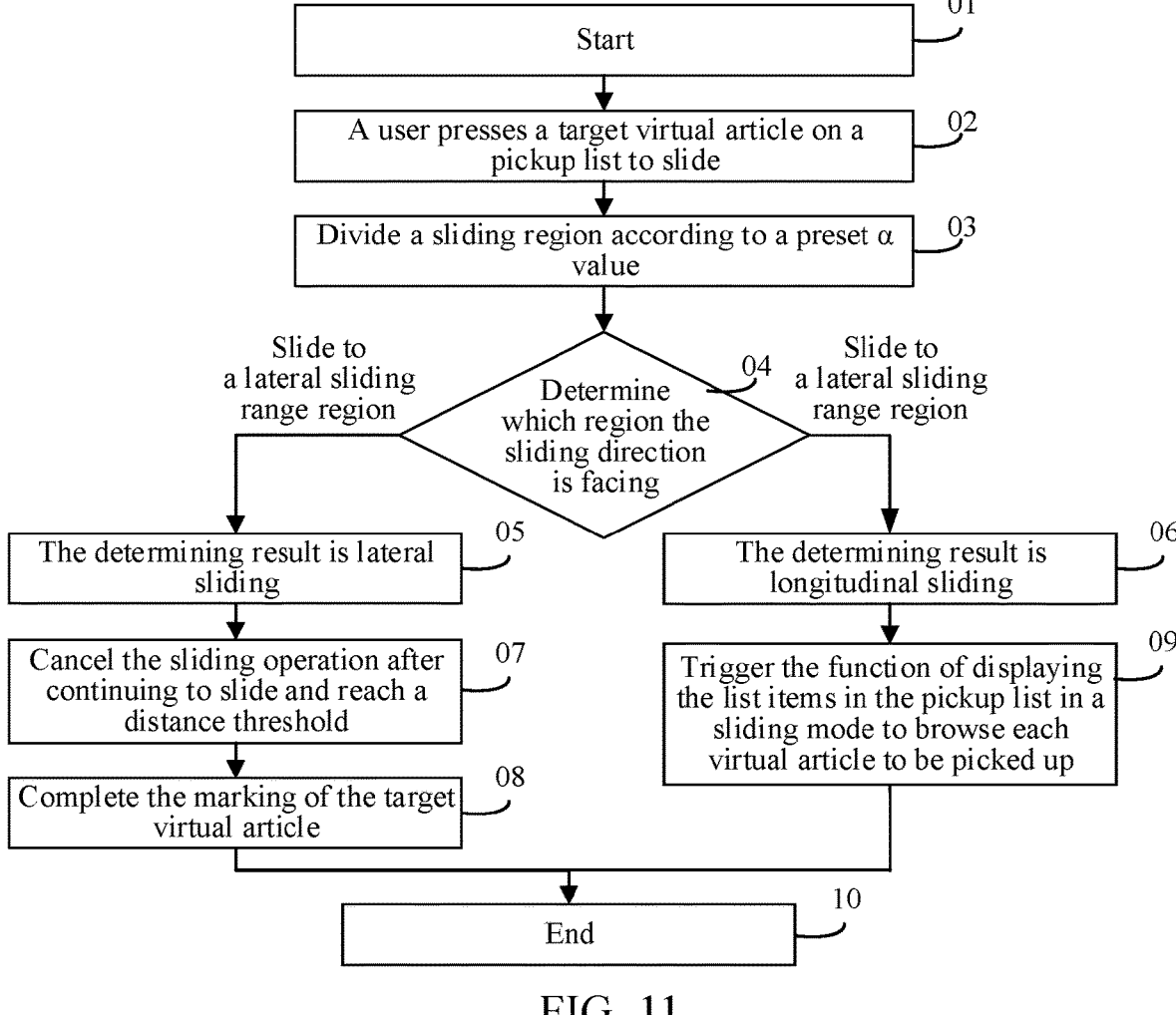
FIG. 11 is an interface diagram of a method for marking a virtual article in a virtual environment according to an embodiment of this application.

As shown in FIG. 10, the lateral sliding range region 66 includes the grid filling region and the slash filling region in FIG. 10, and the longitudinal sliding range region 68 includes the white filling region and the dot matrix filling region in FIG. 10.

Step 04: Determine which region the sliding direction is facing.

When sliding towards the lateral sliding range region 66, step 05 is performed. When sliding towards the longitudinal sliding range region 68, step 06 is performed.

Step 05: The determining result is lateral sliding.

Step 06: The determining result is longitudinal sliding.

Step 07: Cancel the sliding operation after continuing to slide and reach a distance threshold.

In event that the determining result is lateral sliding, it is continued to determine whether the sliding distance of the sliding operation before the end of sliding exceeds the distance threshold.

If the sliding distance before the end of sliding reaches the distance threshold, step 08 is performed. If the sliding distance before the end of sliding does not reach the distance threshold, the marking is canceled.

Step 08: Complete the marking of the target virtual article.

Step 09: Trigger the function of displaying the list items in the pickup list in a sliding mode to browse each virtual article to be picked up.

Step 10: End.

Figures 12, 13:
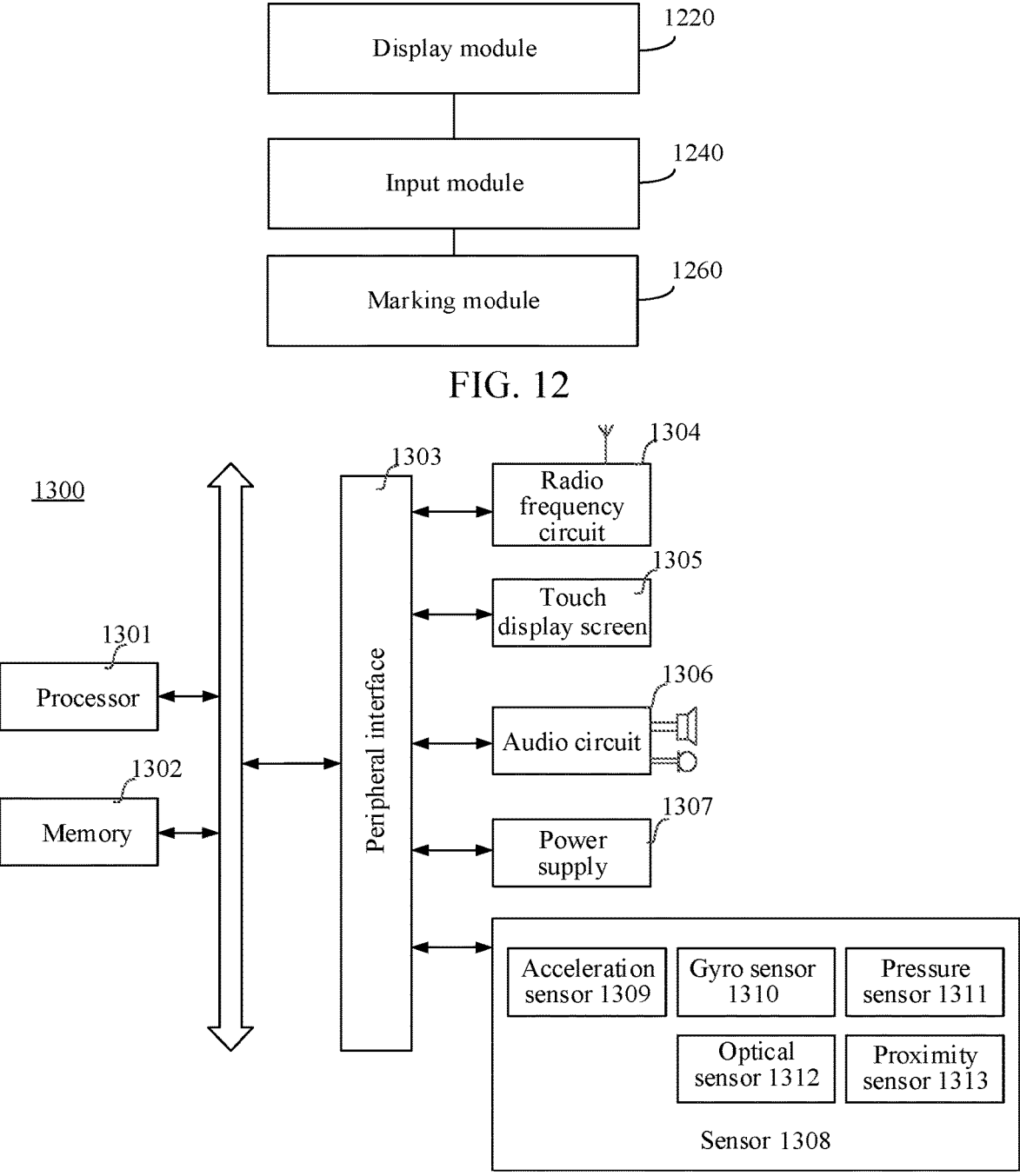
FIG. 12 is a structural diagram of an apparatus for marking a virtual article in a virtual environment according to an embodiment of this application.
FIG. 13 is a structural block diagram of a terminal device according to an embodiment of this application.

FIG. 12 illustrates a block diagram of an apparatus for marking virtual articles in a virtual environment according to an exemplary embodiment of this application. The apparatus includes a display module 1220, an input module 1240, and a marking module 1260.

The display module 1220 is configured to display a pickup list of the first virtual object, where the pickup list is used for displaying at least one virtual article to be picked up by the first virtual object in the virtual environment, and list items in the pickup list are arranged in a first direction.

The input module 1240 is configured to receive a first sliding operation on the pickup list, the first sliding operation being an operation for a list item of a target virtual article in the at least one virtual article.

The marking module 1260 is configured to slide a list item of the target virtual article in the pickup list in a second direction in response to the first sliding operation, and display the target virtual article in a marked state for sharing position information of the target virtual article to a second virtual object.

In some embodiments, the marking module 1260 is configured to slide the list item of the target virtual article in the pickup list along the second direction in event that the angle between the sliding direction of the first sliding operation and the second direction is smaller than an angle threshold, and display the target virtual article in a marked state; or, slide the list item of the target virtual article in the pickup list in the second direction in event that the sliding position of the first sliding operation is within the sliding range region corresponding to the second direction, and display the target virtual article in a marked state.

In some embodiments, the marking module 1260 is configured to slide the list item of the target virtual article in the pickup list along the second direction in event that the angle between the sliding direction of the first sliding operation and the second direction is smaller than the angle threshold; and display the target virtual article in a marked state in event that the sliding distance of the list item of the target virtual article in the second direction reaches a first distance threshold.

In some embodiments, the marking module 1260 is configured to slide the list item of the target virtual article in the pickup list along the second direction in event that the sliding position of the first sliding operation is within the sliding range region corresponding to the second direction; and display the target virtual article in a marked state in event that the sliding distance of the list item of the target virtual article in the second direction reaches a first distance threshold.

In some embodiments, the display module 1220 is further configured to display a marking buoy above the target virtual object located in the virtual environment, the marking buoy being used for sharing the position information of the target virtual object to the second virtual object. The marking buoy has a property of being visual through obstacles.

In some embodiments, the display module 1220 is configured to display a marking icon on the list item of the target virtual article, the marking icon being used for indicating that the target virtual article is in the mark state.

In some embodiments, the input module 1240 is further configured to receive a second sliding operation on the pickup list, the second sliding operation being an operation for a list item of the target virtual article. The marking module 1260 is configured to slide the list item of the target virtual article in the pickup list in the second direction in response to the second sliding operation, and display the target virtual article in an unmarked state.

In some embodiments, the marking module 1260 is configured to slide the list item of the target virtual article in the pickup list in the second direction in response to the second sliding operation; and display the target virtual article in an unmarked state in event that the sliding distance of the list item of the target virtual article in the second direction reaches a second distance threshold.

In some embodiments, the display module 1220 is further configured to cancel the display of the marking buoy of the target virtual article in the virtual environment, the marking buoy being used for sharing the position information of the target virtual article to the second virtual object.

In some embodiments, the display module 1220 is further configured to cancel the displaying of the marking icon on the list item of the target virtual article, the marking icon being used for indicating that the target virtual article is in the mark state.

In some embodiments, the first direction is perpendicular to the second direction.

In embodiments, the first direction is a vertical direction, and the second direction is a horizontal direction. Alternatively, the first direction is a horizontal direction, and the second direction is a vertical direction.

FIG. 13 illustrates a structural block diagram of a terminal device 1300 according to an example embodiment of this application. The terminal device 1300 may be a portable mobile terminal device, such as a smartphone, a tablet computer, a Moving Picture Experts Group Audio Layer III (MP3) player, and a Moving Picture Experts Group Audio Layer IV (MP4) player. The terminal device 1300 may be further referred to as other names such as user equipment and a portable terminal device.

Generally, the terminal device 1300 includes: a processor 1301 and a memory 1302.

The processor 1301 may include one or more processing cores, for example, a 4-core processor or an 8-core processor. The processor 1301 may be implemented by using at least one hardware form of Digital Signal Processing (DSP), a Field-Programmable Gate Array (FPGA), and a Programmable Logic Array (PLA). The processor 1301 may also include a main processor and a coprocessor. The main processor is configured to process data in an active state, also referred to as a Central Processing Unit (CPU). The coprocessor is a low-power processor configured to process data in a standby state. In some embodiments, the processor 1301 may be integrated with a Graphics Processing Unit (GPU). The GPU is configured to render and draw content that needs to be displayed on a display screen. In some embodiments, the processor 1301 may further include an Artificial Intelligence (AI) processor. The AI processor is configured to process computing operations related to machine learning.

The memory 1302 may include one or more computer-readable storage media. The computer-readable storage media may be tangible and non-transient. The memory 1302 may further include a high-speed random access memory and a nonvolatile memory, for example, one or more disk storage devices or flash storage devices. In some embodiments, the non-transient computer-readable storage medium in the memory 1302 is configured to store at least one instruction, and the at least one instruction being executed by the processor 1301 to implement the method provided in the embodiments of this application. In some embodiments, the terminal device 1300 may optionally include: a peripheral interface 1303 and at least one peripheral device. Specifically, the peripheral device includes: at least one of a Radio Frequency (RF) circuit 1304, a touch display screen 1305, an audio circuit 1306, and a power supply 1307.

The peripheral interface 1303 may be configured to connect at least one peripheral device related to Input/Output (I/O) to the processor 1301 and the memory 1302. In some embodiments, the processor 1301, the memory 1302, and the peripheral interface 1303 are integrated on the same chip or the same circuit board. In some other embodiments, any or both of the processor 1301, the memory 1302, and the peripheral interface 1303 may be implemented on an independent chip or circuit board. This is not limited in this embodiment.

The RF circuit 1304 is configured to receive and transmit an RF signal, which is also referred to as an electromagnetic signal. The RF circuit 1304 communicates with a communication network and other communication devices through the electromagnetic signal. The RF circuit 1304 converts an electrical signal into an electromagnetic signal for transmission, or converts a received electromagnetic signal into an electrical signal. Optionally, the RF circuit 1304 include: an antenna system, an RF transceiver, one or more amplifiers, a tuner, an oscillator, a digital signal processor, a codec chipset, a user identity module card, and the like. The RF circuit 1304 may communicate with other terminal devices through at least one wireless communication protocol. The wireless communication protocol includes, but is not limited to: World Wide Web (WWW), Metropolitan Area Network (MAN), Intranet, each generation of mobile communication networks (2G, 3G, 4G, and 5G), Wireless Local Area Network (WLAN) and/or Wireless Fidelity (Wi-Fi) networks. In some embodiments, the RF circuit 1304 may further include a circuit related to Near Field Communication (NFC), which is not limited by this application.

The touch display screen 1305 is configured to display a UI. The UI may include a graph, text, an icon, a video, and any combination thereof. The touch display screen 1305 also has a capability of collecting a touch signal on or above a surface of the touch display screen 1305. The touch signal may be inputted to the processor 1301 as a control signal for processing. The touch display screen 1305 is configured to provide a virtual button and/or a virtual keyboard, which is also referred to as a soft button and/or a soft keyboard. In some embodiments, there may be one touch display screen 1305 disposed on a front panel of the terminal device 1300. In some other embodiments, there are at least two touch display screens 1305 respectively disposed on different surfaces of the terminal device 1300 or in a folded design. In still other embodiments, the touch display screen 1305 may be a flexible display screen disposed on a curved surface or a folded surface of the terminal device 1300. Even, the touch display screen 1305 may be further set in a non-rectangular irregular pattern, namely, a special-shaped screen. The touch display screen 1305 may be made of materials such as a Liquid Crystal Display (LCD), and an Organic Light-Emitting Diode (OLED).

The audio circuit 1306 is configured to provide an audio interface between a user and the terminal device 1300. The audio circuit 1306 may include a microphone and a loudspeaker. The microphone is configured to acquire sound waves of a user and an environment, and convert the sound waves into an electrical signal to be inputted to the processor 1301 for processing, or inputted to the radio circuit 1304 for implementing voice communication. For a purpose of stereo acquisition or noise reduction, there may be a plurality of microphones disposed at different portions of the terminal device 1300. The microphone may further be an array microphone or an omni-directional acquisition type microphone. The loudspeaker is configured to convert electrical signals from the processor 1301 or the RF circuit 1304 into sound waves. The loudspeaker may be a conventional film loudspeaker, or may be a piezoelectric ceramic loudspeaker. In a case that the loudspeaker is the piezoelectric ceramic loudspeaker, the loudspeaker not only can convert an electric signal into acoustic waves audible to human beings, but also can convert an electric signal into acoustic waves inaudible to human beings, for ranging and other purposes. In some embodiments, the audio circuit 1306 may further include a headphone jack.

The power supply 1307 is configured to supply power to components in the terminal device 1300. The power supply 1307 may be an alternating-current power supply, a direct-current power supply, a disposable battery, or a rechargeable battery. In a case that the power supply 1307 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal device 1300 further includes one or more sensors 1308. The one or more sensors 1308 include, but are not limited to: an acceleration sensor 1309, a gyro sensor 1310, a pressure sensor 1311, an optical sensor 1312, and a proximity sensor 1313.

The acceleration sensor 1309 may detect a magnitude of acceleration on three coordinate axes of a coordinate system established by the terminal device 1300. For example, the acceleration sensor 1309 may be configured to detect components of gravity acceleration on the three coordinate axes. The processor 1301 may control, according to a gravity acceleration signal acquired by the acceleration sensor 1309, the touch display screen 1305 to display the user interface in a transverse view or a longitudinal view. The acceleration sensor 1309 may be further configured to collect data of a game or a user movement.

The gyro sensor 1310 may detect a body direction and a rotation angle of the terminal device 1300, and the gyro sensor 1310 may work with the acceleration sensor 1309 to collect a 3D action performed by the user on the terminal device 1300. The processor 1301 may implement the following functions according to the data collected by the gyro sensor 1310: motion sensing (for example, change of the UI based on a tilt operation of the user), image stabilization during photographing, game control, and inertial navigation.

The pressure sensor 1311 may be disposed on a side frame of the terminal device 1300 and/or a lower layer of the touch display screen 1305. In a case that the pressure sensor 1311 is disposed at the side frame of the terminal device 1300, a holding signal of the user on the terminal device 1300 may be detected, and left/right hand identification and a quick action may be performed according to the holding signal. In a case that the pressure sensor 1311 is disposed at the lower layer of the touch display screen 1305, an operable control on the UI interface can be controlled according to a pressure operation of the user on the touch display screen 1305. The operable control includes at least one of a button control, a scroll-bar control, an icon control, and a menu control.

The optical sensor 1312 is configured to acquire ambient light intensity. In an embodiment, the processor 1301 may control the display brightness of the touch display screen 1305 according to the ambient light intensity acquired by the optical sensor 1312. Specifically, in a case that the ambient light intensity is relatively high, the display luminance of the touch display screen 1305 is increased, and in a case that the ambient light intensity is relatively low, the display brightness of the touch display screen 1305 is reduced.

The proximity sensor 1313, also referred to as a distance sensor, is generally disposed on the front surface of the terminal device 1300. The proximity sensor 1313 is configured to collect a distance between the user and the front surface of the terminal device 1300. In an embodiment, in a case that the proximity sensor 1316 detects that the distance between the user and the front surface of the terminal device 1300 gradually becomes small, the touch display screen 1305 is controlled by the processor 1301 to switch from a screen-on state to a screen-off state. In a case that the proximity sensor 1313 detects that the distance between the user and the front surface of the terminal device 1300 gradually increases, the touch display screen 1305 is controlled by the processor 1301 to switch from the screen-off state to the screen-on state.

A person skilled in the art may understand that the structure shown in FIG. 13 constitutes no limitation on the terminal device 1300, and the terminal device may include more or fewer components than those shown in the figure, or some components may be combined, or a different component deployment may be used.

An embodiment of this application further provides a computer-readable storage medium having at least one instruction stored thereon. The at least one instruction is loaded and executed by a processor to implement the method for marking virtual articles in a virtual environment described in the foregoing embodiments.

According to another aspect of this application, a computer program product is provided, including computer instructions. The computer instructions are stored in a computer-readable storage medium. A processor of a terminal device reads the computer instructions from the computer-readable storage medium, and executes the computer instructions, to cause the terminal device to perform the method for marking virtual articles in a virtual environment provided in any optional implementations of the foregoing aspect.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. A method for marking a virtual article in a virtual environment, the method being performed by a terminal device, the method comprising:

displaying a pickup list of a first virtual object, wherein the pickup list is used to display at least one virtual object to be picked up by the first virtual object in the virtual environment, and list items in the pickup list are arranged in a first direction;

receiving a first sliding operation performed on the pickup list, the first sliding operation performed on a list item of a target virtual article in the at least one virtual article; and sliding the list item of the target virtual article in the pickup list along a second direction in response to the first sliding operation, and displaying the target virtual article in a marked state, the marked state used to share position information of the target virtual article to a second virtual object.

2. The method according to claim 1, wherein the sliding the list item of the target virtual article in the pickup list along the second direction in response to the first sliding operation, and the displaying the target virtual article in the marked state comprises:

sliding the list item of the target virtual article in the pickup list along the second direction when an angle between a sliding direction of the first sliding operation and the second direction is smaller than an angle threshold, and displaying the target virtual article in the marked state; or sliding the list item of the target virtual article in the pickup list along the second direction when the sliding position of the first sliding operation is within a sliding range region corresponding to the second direction, and displaying the target virtual article in the marked state.

3. The method according to claim 2, wherein the sliding the list item of the target virtual article in the pickup list along the second direction when the angle between the sliding direction of the first sliding operation and the second direction is smaller than the angle threshold, and the displaying the target virtual article in the marked state comprises:

sliding the list item of the target virtual article in the pickup list along the second direction when the angle between the sliding direction of the first sliding operation and the second direction is smaller than the angle threshold; and displaying the target virtual article in the marked state when a sliding distance of the list item of the target virtual article in the second direction reaches a first distance threshold.

4. The method according to claim 2, wherein the sliding the list item of the target virtual article in the pickup list along the second direction when the sliding position of the first sliding operation is within a sliding range region corresponding to the second direction, and the displaying the target virtual article in the marked state comprises:

sliding the list item of the target virtual article in the pickup list along the second direction when the sliding position of the first sliding operation is within the sliding range region corresponding to the second direction; and displaying the target virtual article in the marked state in a case that the sliding distance of the list item of the target virtual article in the second direction reaches a first distance threshold.

5. The method according to claim 1, wherein the method further comprises:

displaying a marking buoy above the target virtual article in the virtual environment, the marking buoy used to share the position information of the target virtual article to the second virtual object;

wherein the marking buoy has a property of being visible through obstacles.

6. The method according to claim 1, wherein the displaying the target virtual article in the marked state comprises:

displaying a marking icon on the list item of the target virtual article, the marking icon used to indicate that the target virtual article is in the marked state.

7. The method according to claim 1, wherein the method further comprises:

receiving a second sliding operation performed on the pickup list, the second sliding operation performed on the list item of the target virtual article; and sliding the list item of the target virtual article in the pickup list along the second direction in response to the second sliding operation, and displaying the target virtual article in an unmarked state.

8. The method according to claim 7, wherein the sliding the list item of the target virtual article in the pickup list along the second direction in response to the second sliding operation, and displaying the target virtual article in an unmarked state comprises:

sliding the list item of the target virtual article in the pickup list along the second direction in response to the second sliding operation; and displaying the target virtual article in the unmarked state when a sliding distance of the list item of the target virtual article in the second direction reaches a second distance threshold.

9. The method according to claim 7, wherein after the receiving a second sliding operation performed on the pickup list, the method further comprises:

canceling displaying of a marking buoy above the target virtual article in the virtual environment, the marking buoy used to share the position information of the target virtual article to a second virtual object.

10. The method according to claim 7, wherein after the receiving the second sliding operation performed on the pickup list, the method further comprises:

canceling displaying of a marking icon on the list item of the target virtual article, the marking icon used to indicate that the target virtual article is in the marked state.

11. The method according to claim 1, wherein the first direction is perpendicular to the second direction.

12. The method according to claim 11, wherein the first direction is a vertical direction and the second direction is a horizontal direction, or the first direction is a horizontal direction and the second direction is a vertical direction.

13. An apparatus for marking a virtual article in a virtual environment, comprising:

a memory storing a plurality of instructions; and a processor configured to execute the plurality of instructions, and upon execution of the plurality of instructions, is configured to:

display a pickup list of a first virtual object, wherein the pickup list is used to display at least one virtual article to be picked up by the first virtual object in the virtual environment, and list items in the pickup list are arranged in a first direction;

receive a first sliding operation performed on the pickup list, the first sliding operation performed on a list item of a target virtual article in the at least one virtual article; and slide the list item of the target virtual article in the pickup list along a second direction in response to the first sliding operation, and display the target virtual article in a marked state, the marked state used to share position information of the target virtual article to a second virtual object.

14. The apparatus according to claim 13, wherein in order to slide the list item of the target virtual article in the pickup list along the second direction in response to the first sliding operation, and display the target virtual article in the marked state, the processor, upon execution of the plurality of instructions, is configured to:

slide the list item of the target virtual article in the pickup list along the second direction when an angle between a sliding direction of the first sliding operation and the second direction is smaller than an angle threshold, and display the target virtual article in the marked state; or slide the list item of the target virtual article in the pickup list along the second direction when the sliding position of the first sliding operation is within a sliding range region corresponding to the second direction, and display the target virtual article in the marked state.

15. The apparatus according to claim 13, wherein the processor, upon execution of the plurality of instructions, is further configured to:

display a marking buoy above the target virtual article in the virtual environment, the marking buoy used to share the position information of the target virtual article to the second virtual object, wherein the marking buoy has a property of being visible through obstacles.

16. The apparatus according to claim 13, wherein the processor, upon execution of the plurality of instructions, is further configured to:

display a marking icon on the list item of the target virtual article, the marking icon used to indicate that the target virtual article is in the marked state.

17. A non-transitory computer-readable storage medium storing a plurality of instructions executable by a processor, wherein upon execution, the plurality of instructions is configured to cause the processor to:

display a pickup list of a first virtual object, wherein the pickup list is used to display at least one virtual article to be picked up by the first virtual object in the virtual environment, and list items in the pickup list are arranged in a first direction;

receive a first sliding operation performed on the pickup list, the first sliding operation performed on a list item of a target virtual article in the at least one virtual article; and slide the list item of the target virtual article in the pickup list along a second direction in response to the first sliding operation, and display the target virtual article in a marked state, the marked state used to share position information of the target virtual article to a second virtual object.

18. The non-transitory computer-readable storage medium of claim 17, wherein in order to slide the list item of the target virtual article in the pickup list along the second direction in response to the first sliding operation, and display the target virtual article in the marked state, the plurality of instructions, upon execution by the processor, is configured to cause the processor to:

slide the list item of the target virtual article in the pickup list along the second direction when an angle between a sliding direction of the first sliding operation and the second direction is smaller than an angle threshold, and display the target virtual article in the marked state; or slide the list item of the target virtual article in the pickup list along the second direction when the sliding position of the first sliding operation is within a sliding range region corresponding to the second direction, and display the target virtual article in the marked state.

19. The non-transitory computer-readable storage medium according to claim 17, wherein the plurality of instructions, upon execution by the processor, is further configured to cause the processor to:

receive a second sliding operation performed on the pickup list, the second sliding operation performed on the list item of the target virtual article; and slide the list item of the target virtual article in the pickup list along the second direction in response to the second sliding operation, and display the target virtual article in an unmarked state.

20. The non-transitory computer-readable storage medium according to claim 17, wherein the first direction is perpendicular to the second direction.

* * * * *